US008440128B2

(12) United States Patent
Love

(10) Patent No.: US 8,440,128 B2
(45) Date of Patent: May 14, 2013

(54) FLEXIBLE MAGNETIC SHEET SYSTEMS

(76) Inventor: Thomas G. Love, Marietta, OH (US)

( * ) Notice: Subject to any disclaimer, the term of this patent is extended or adjusted under 35 U.S.C. 154(b) by 746 days.

(21) Appl. No.: 12/577,812

(22) Filed: Oct. 13, 2009

(65) Prior Publication Data

US 2010/0028667 A1 Feb. 4, 2010

Related U.S. Application Data

(63) Continuation-in-part of application No. 12/276,094, filed on Nov. 21, 2008, and a continuation-in-part of application No. 12/421,515, filed on Apr. 9, 2009, now abandoned.

(60) Provisional application No. 61/183,006, filed on Jun. 1, 2009, provisional application No. 61/045,569, filed on Apr. 16, 2008, provisional application No. 60/990,246, filed on Nov. 26, 2007, provisional application No. 61/046,374, filed on Apr. 18, 2008, provisional application No. 61/105,762, filed on Oct. 15, 2008.

(51) Int. Cl.
*B29C 67/00* (2006.01)

(52) U.S. Cl.
USPC ............................ 264/429; 264/108; 264/109

(58) Field of Classification Search ........................ None
See application file for complete search history.

(56) References Cited

U.S. PATENT DOCUMENTS

| | | | | |
|---|---|---|---|---|
| 3,596,350 | A * | 8/1971 | Steingroever | 29/598 |
| 4,919,858 | A * | 4/1990 | Newton et al. | 264/429 |
| 5,869,148 | A | 2/1999 | Silverschotz et al. | |
| 5,994,990 | A | 11/1999 | Ogikubo | |
| 7,187,511 | B2 | 3/2007 | Nakao | |
| 7,338,573 | B2 | 3/2008 | Boudouris et al. | |
| 7,601,281 | B2 * | 10/2009 | Masaki et al. | 264/108 |
| 2002/0081446 | A1 * | 6/2002 | Boudouris et al. | 428/469 |
| 2006/0244168 | A1 * | 11/2006 | Zhang | 264/108 |
| 2006/0255895 | A1 * | 11/2006 | Richards et al. | 335/306 |

FOREIGN PATENT DOCUMENTS

| | | | |
|---|---|---|---|
| EP | 1199729 | A1 | 4/2002 |
| JP | 58-178508 | | 10/1983 |
| JP | 08-152859 | | 6/1996 |
| KR | 10-0475768 | B1 | 11/2000 |
| KR | 10-2007-0045095 | | 5/2007 |
| WO | WO9424641 | A1 | 10/1994 |

* cited by examiner

*Primary Examiner* — Mary F Theisen
(74) *Attorney, Agent, or Firm* — Stoneman Law Patent Group; Martin L. Stoneman

(57) ABSTRACT

Flexible magnetic sheets made with high-energy strontium ferrite and oriented magnetic particles of strontium ferrite and barium ferrite, such as to decrease thickness while maintaining a strong magnetic energy as well as flexibility.

24 Claims, 14 Drawing Sheets

FLEXIBLE MAGNETIC SHEET SYSTEMS

CROSS-REFERENCE TO RELATED APPLICATION

The present application is a continuation-in-part and is related to and claims priority from application Ser. No. 12/276,094, filed Nov. 21, 2008, entitled "FLEXIBLE MAGNETIC SHEET SYSTEMS", which application is related to and claims priority from prior provisional application Ser. No. 61/045,569, filed Apr. 16, 2008, entitled "FLEXIBLE MAGNETIC SHEET SYSTEMS", and is related to and claims priority from prior provisional application Ser. No. 60/990,246, filed Nov. 26, 2007, entitled "PRINTABLE FLEXIBLE MAGNETIC LAMINATE SYSTEMS". In addition, the present application is a continuation-in-part and is related to and claims priority from application Ser. No. 12/421,515, filed Apr. 9, 2009, entitled "MAGNETIC WALLPAPER SYSTEMS", which prior application is related to and claims priority from prior provisional application Ser. No. 61/046,374, filed Apr. 18, 2008, entitled "MAGNETIC WALLPAPER SYSTEMS". Further, the present application is related to and claims priority from prior provisional application Ser. No. 61/105,762, filed Oct. 15, 2008, entitled "ORIENTED MAGNETIC-PARTICLE SYSTEMS". Also, the present application is related to and claims priority from prior provisional application Ser. No. 61/183,006, filed Jun. 1, 2009, entitled "MAGNETIC WALLPAPER SYSTEMS". The contents of all of which are incorporated herein by this reference and are not admitted to be prior art with respect to the present invention by the mention in this cross-reference section.

BACKGROUND

This invention relates to providing a system for improved flexible magnetic sheets. More particularly, this invention relates to providing a system for making flexible magnetic sheets having high-energy magnetization.

Typically, flexible magnetic sheets, if made thinner, lose a significant amount of their magnetic energy to the point where they may not even hold their own weight against a vertical magnetically-compatible surface. Additionally, if such thinner flexible magnetic sheets have increased magnetic particles to overcome the deficiency of magnetic energy, they become brittle and no longer function as "flexible".

Thus, there is a need for providing of improved thin flexible sheets having higher potential for magnetic energy.

OBJECTS AND FEATURES OF THE INVENTION

A primary object and feature of the present invention is to provide a flexible magnetic sheet system overcoming the above-mentioned problems.

It is a further object and feature of the present invention to provide such a flexible magnetic sheet system making flexible magnetic sheets thinner than 15 mils.

It is yet a further object and feature of the present invention to provide such a flexible magnetic sheet system making flexible magnetic sheets with high-energy strontium ferrite.

A further primary object and feature of the present invention is to provide such a system that is efficient, inexpensive, and handy.

Other objects and features of this invention will become apparent with reference to the following descriptions.

Another primary object and feature of the present invention is to provide such a system having magnetically oriented magnetic-particles.

Yet another object and feature of the present invention is to provide such a system having roll forms or unitary sheets of printable, writable or printed magnetic material from which shapes comprising oriented magnetic-particles may be cut.

Still another object and feature of the present invention is to provide manufacturing methods of such a system having the magnetically oriented magnetic-particles.

A further primary object and feature of the present invention is to provide such oriented magnetic-particle systems, and methods that are efficient, inexpensive, and handy. Other objects and features of this invention will become apparent with reference to the following descriptions.

SUMMARY OF THE INVENTION

In accordance with a preferred embodiment hereof, this invention provides a magnetizable-sheet laminate system comprising: at least one magnetizable laminate layer; at least one printable laminate layer; and at least one attacher laminate layer structured and arranged to attach such at least one magnetizable laminate layer with such at least one printable laminate layer; wherein such magnetizable-sheet laminate system comprises at least one laminate less than about 20 mil thick. Moreover, it provides such a magnetizable-sheet laminate system wherein such at least one magnetizable laminate layer comprises at least one thickness less than about 15 mils thick.

Additionally, it provides such a magnetizable-sheet laminate system wherein such at least one printable laminate layer comprises at least one matte finish. Also, it provides such a magnetizable-sheet laminate system wherein such at least one printable laminate layer comprises at least one high-gloss finish. In addition, it provides such a magnetizable-sheet laminate system wherein such at least one printable laminate layer comprises at least one gloss finish. And, it provides such a magnetizable-sheet laminate system wherein such at least one printable laminate layer comprises at least one wipe-off finish.

Further, it provides such a magnetizable-sheet laminate system wherein such at least one printable laminate layer comprises vinyl. Even further, it provides such a magnetizable-sheet laminate system wherein such at least one printable laminate layer comprises at least one matte finish. Moreover, it provides such a magnetizable-sheet laminate system wherein such at least one printable laminate layer comprises at least one high-gloss finish. Additionally, it provides such a magnetizable-sheet laminate system wherein such at least one printable laminate layer comprises at least one gloss finish. Also, it provides such a magnetizable-sheet laminate system wherein such at least one printable laminate layer comprises at least one wipe-off finish.

In addition, it provides such a magnetizable-sheet laminate system wherein such at least one laminate comprises at least one width of about two feet. And, it provides such a magnetizable-sheet laminate system wherein such at least one laminate comprises at least one roll. Further, it provides such a magnetizable-sheet laminate system wherein such at least one magnetizable laminate layer comprises strontium ferrite. Even further, it provides such a magnetizable-sheet laminate system wherein such at least one magnetizable laminate layer, by weight, comprises about 91% strontium ferrite.

Moreover, it provides such a magnetizable-sheet laminate system wherein such at least one magnetizable laminate layer comprises at least one binder material structured and arranged to bind together components of such at least one magnetizable laminate layer. Additionally, it provides such a magnetizable-sheet laminate system wherein such at least one binder material comprises: chlorosulfonated polyethylene rubber; polyisobutylene; and ethylene vinyl acetate. Also, it provides such a magnetizable-sheet laminate system wherein such at least one binder material, by weight of such at least one magnetizable laminate layer, comprises: about 3.6% chlorosulfonated polyethylene rubber; about 3% polyisobutylene; and about 2.2% ethylene vinyl acetate.

In accordance with another preferred embodiment hereof, this invention provides a magnetizable-sheet system comprising: at least one homogenous sheet comprising at least one binder material structured and arranged to bind together components of such at least one homogenous sheet, and at least one plurality of magnetizable particles held by such at least one binder material, wherein such at least one plurality of magnetizable particles consist essentially of strontium ferrite, and wherein such at least one plurality of magnetizable particles when magnetized comprise a magnetic energy of greater than one Megagauss-Oersted. In addition, it provides such a magnetizable-sheet system wherein such at least one homogenous sheet comprises at least one thickness less than about 15 mils thick.

And, it provides such a magnetizable-sheet system wherein such at least one binder material comprises: chlorosulfonated polyethylene rubber; polyisobutylene; and ethylene vinyl acetate. Further, it provides such a magnetizable-sheet system wherein such at least one binder material, by weight of such at least one homogeneous sheet, comprises: about 3.6% chlorosulfonated polyethylene rubber; about 3% polyisobutylene; and about 2.2% ethylene vinyl acetate. Even further, it provides such a magnetizable-sheet system wherein such at least one homogeneous sheet, by weight, comprises about 91% strontium ferrite. Moreover, it provides such a magnetizable-sheet system wherein such at least one homogenous sheet comprises at least one width of about two feet. Additionally, it provides such a magnetizable-sheet system wherein such at least one homogenous sheet comprises at least one roll.

In accordance with another preferred embodiment hereof, this invention provides a magnetizable-sheet laminate system comprising: at least one magnetizable laminate layer comprising at least one binder material structured and arranged to bind together components of such at least one magnetizable laminate layer, at least one plurality of magnetizable particles held by such at least one binder material, wherein such at least one plurality of magnetizable particles consist essentially of strontium ferrite, and wherein such at least one plurality of magnetizable particles when magnetized comprise a magnetic energy of greater than one Megagauss-Oersted; at least one printable laminate layer; and at least one attacher laminate layer structured and arranged to attach such at least one magnetizable laminate layer with such at least one printable laminate layer; wherein such magnetizable-sheet laminate system comprises at least one laminate less than about 20 mils thick. Also, it provides such a magnetizable-sheet laminate system wherein such at least one magnetizable laminate layer comprises at least one thickness less than about 15 mils thick.

In addition, it provides such a magnetizable-sheet laminate system wherein such at least one printable laminate layer comprises at least one matte finish. And, it provides such a magnetizable-sheet laminate system wherein such at least one printable laminate layer comprises at least one high-gloss finish. Further, it provides such a magnetizable-sheet laminate system wherein such at least one printable laminate layer comprises at least one gloss finish. Even further, it provides such a magnetizable-sheet laminate system wherein such at least one printable laminate layer comprises at least one wipe-off finish.

Moreover, it provides such a magnetizable-sheet laminate system wherein such at least one printable laminate layer comprises vinyl. Additionally, it provides such a magnetizable-sheet laminate system wherein such at least one printable laminate layer comprises at least one matte finish. Also, it provides such a magnetizable-sheet laminate system wherein such at least one printable laminate layer comprises at least one high-gloss finish. In addition, it provides such a magnetizable-sheet laminate system wherein such at least one printable laminate layer comprises at least one gloss finish. And, it provides such a magnetizable-sheet laminate system wherein such at least one printable laminate layer comprises at least one wipe-off finish.

Further, it provides such a magnetizable-sheet laminate system wherein such at least one laminate comprises at least one width of about two feet. Even further, it provides such a magnetizable-sheet laminate system wherein such at least one laminate comprises at least one roll. Moreover, it provides such a magnetizable-sheet laminate system wherein such at least one magnetizable laminate layer, by weight, comprises about 91% strontium ferrite.

Additionally, it provides such a magnetizable-sheet laminate system wherein such at least one binder material comprises: chlorosulfonated polyethylene rubber; polyisobutylene; and ethylene vinyl acetate. Also, it provides such a magnetizable-sheet laminate system wherein such at least one binder material, by weight of such at least one magnetizable laminate layer, comprises: about 3.6% chlorosulfonated polyethylene rubber; about 3% polyisobutylene; and about 2.2% ethylene vinyl acetate. In addition, it provides such a magnetizable-sheet laminate system wherein such at least one magnetizable laminate layer, by weight, comprises about 91% strontium ferrite.

And, it provides such a magnetizable-sheet laminate system wherein such at least one magnetizable laminate layer comprises at least one thickness less than about 15 mils thick. Further, it provides such a magnetizable-sheet laminate system wherein such at least one laminate comprises at least one width of about two feet. Even further, it provides such a magnetizable-sheet laminate system wherein such at least one laminate comprises at least one roll. Even further, it provides such a magnetizable-sheet laminate system wherein such at least one printable laminate layer comprises vinyl.

Even further, it provides such a magnetizable-sheet laminate system wherein such at least one printable laminate layer comprises at least one matte finish. Even further, it provides such a magnetizable-sheet laminate system wherein such at least one printable laminate layer comprises at least one high-gloss finish. Even further, it provides such a magnetizable-sheet laminate system wherein such at least one printable laminate layer comprises at least one gloss finish. Even further, it provides such a magnetizable-sheet laminate system wherein such at least one printable laminate layer comprises at least one wipe-off finish.

In accordance with another preferred embodiment hereof, this invention provides a magnetizable-sheet laminate system comprising: magnetizable-layer means for providing at least one magnetizable laminate layer; printable layer means for providing at least one printable layer; and attacher layer means for attaching such magnetizable-layer means with such printable layer means; wherein such magnetizable-sheet laminate system comprises at least one laminate less than about 20 mils thick.

In accordance with another preferred embodiment hereof, this invention provides a method, relating to providing magnetizable film sufficiently thin for use in secondary processes, comprising the step(s) of: providing in bulk at least one binder material; providing in bulk magnetizable particles; and mixing a first quantity of such binder material with a second quantity of such magnetizable particles; wherein at least one configurable mix is provided; and configuring such at least one configurable mix into at least one continuous magnetizable film no thicker than about 15 mils.

Moreover, it provides such a method wherein such step of configuring such at least one configurable mix into at least one continuous magnetizable film no thicker than about 15 mils comprises the step(s) of: at least one shaping step of such at least one configurable mix to provide at least one intermediate configuration promoting magnetizing of such magnetizable particles; and at least one magnetizing step of such at least one intermediate configuration.

Additionally, it provides such a method wherein essentially each such at least one magnetizing step is followed by at least one de-magnetizing step. Also, it provides such a method wherein such magnetizable particles comprise essentially a major-dimension particle-size range of about 20 micro-inches to about 100 micro-inches. In addition, it provides such a method wherein such magnetizable particles comprise at least one ferrite having magnetic properties based on compositions of $BaO.6Fe_2O_3$, where Ba is barium, Fe is iron, and o is oxygen. And, it provides such a method wherein such magnetizable particles comprise at least one ferrite having magnetic properties based on compositions of $SrO.6Fe_2O_3$, sr is strontium, Fe is iron, and o is oxygen.

Further, it provides such a method where such binder material comprises at least one polymer. Even further, it provides such a method where such binder material comprises at least one polyvinyl. Moreover, it provides such a method where such binder material comprises at least one polyurethane. Additionally, it provides such a method where such binder material comprises at least one polyamide. Also, it provides such a method where such binder material comprises at least one polyester. In addition, it provides such a method where such binder material comprises at least one acrylic.

And, it provides such a method where such binder material comprises at least one copolymer of vinyl and urethane. Further, it provides such a method where such binder material comprises at least one copolymer of urethane and acrylic. Even further, it provides such a method where such binder material comprises at least one copolymer of vinyl and acrylic. Moreover, it provides such a method where such binder material comprises at least one slurry. Additionally, it provides such a method wherein such binder material comprises at least one slurry substantially comprising thixotropic properties.

Also, it provides such a method wherein such at least one shaping step is preceded by at least one viscosity adjustment step of such at least one configurable mix. In addition, it provides such a method wherein such at least one viscosity adjustment step is followed by at least one plastic aligning step of such tabular magnetic-particles within such at least one configurable mix step. And, it provides such a method wherein such at least one plastic aligning step is followed by at least one de-magnetizing step of such tabular magnetic-particles step. Further, it provides such a method wherein such at least one de-magnetizing step is followed by at least one viscosity adjustment step. Even further, it provides such a method wherein such at least one de-magnetizing step is followed by at least one take-up roller step.

In accordance with another preferred embodiment hereof, this invention provides a method, relating to the supplying materials for and fabricating custom-magnetic products, comprising the step(s) of: identifying at least one custom-magnetic-products fabricator; supplying such fabricator with flexible magnetic film materials monetizing trade arrangements for value, with such at least one fabricator to supply such flexible magnetic film materials to assist custom-magnetic-products fabricating to at least one customer, to assist such at least one customer in obtaining custom-magnetic products, and to assist such at least one customer in fabrication of at least one custom-magnetic product; assisting such fabricator in contracting with such at least one customer; and assisting such fabricator in fabricating such at least one custom-magnetic-product.

In accordance with another preferred embodiment hereof, this invention provides a sheet system comprising at least one sheet comprising: at least one indicia-accepting surface structured and arranged to accept placement of indicia; at least one underlying sheet layer underlying such at least one indicia-accepting surface, such at least one sheet layer being magnetizable; wherein such at least one sheet comprises at least one thickness of less than about 15 mils. Moreover, it provides such a sheet system wherein such at least one indicia-accepting surface accepts written indicia. Additionally, it provides such a sheet system wherein such at least one indicia-accepting surface accepts printed indicia. Also, it provides such a magnetizable sheet system wherein such at least one underlying sheet layer comprises magnetic particles substantially magnetically aligned.

In accordance with another preferred embodiment hereof, this invention provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
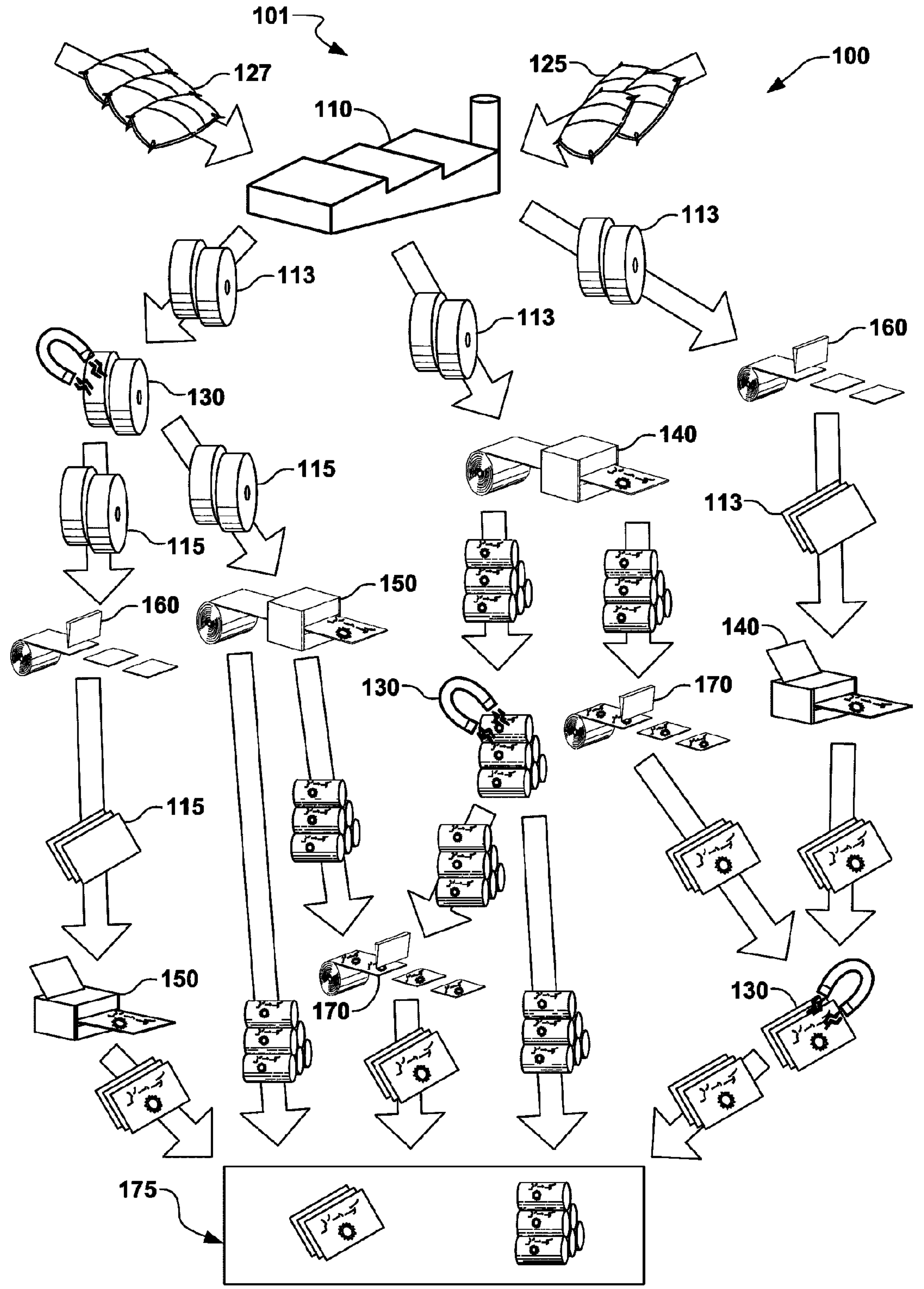
FIG. 1 shows a diagram, illustrating a preferred flexible magnetic sheet system, according to a preferred embodiment of the present invention.
Figure 2:
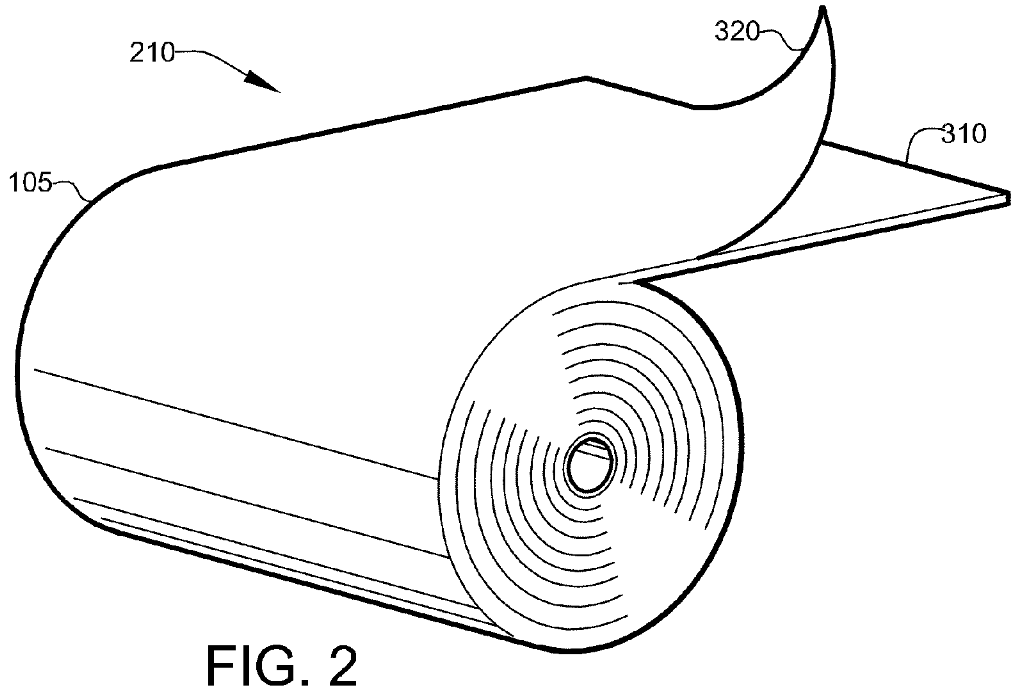
FIG. 2 shows a perspective view, illustrating at least one preferred roll of a preferred magnetic laminate, according to the preferred embodiment of FIG. 1.
Figure 3:
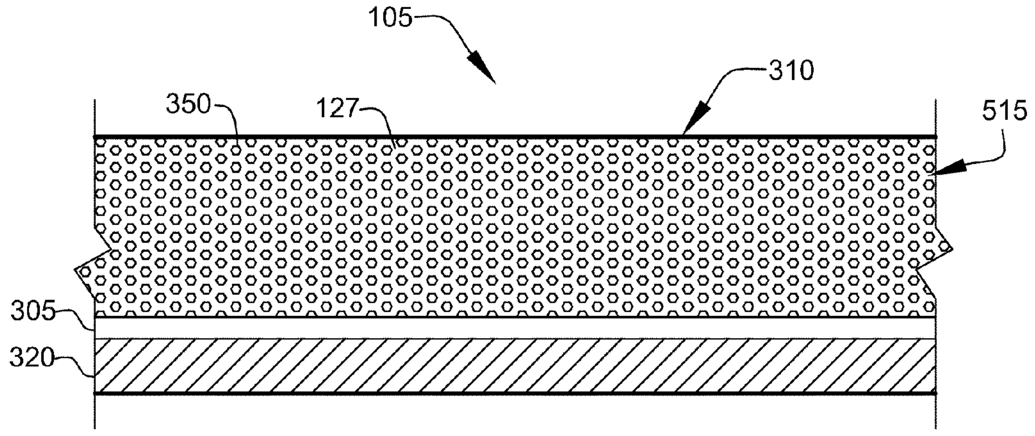
FIG. 3 shows an enlarged edge view of preferred magnetic laminate, illustrating the preferred layers of the preferred magnetic laminate, according to the preferred embodiment of FIG. 1.

FIG. 1 shows a diagram, illustrating a flexible magnetic sheet system 100, according to a preferred embodiment 101 of the present invention. In preferred embodiment 101 of flexible magnetic sheet system 100 preferably comprises manufacturing and preferably printing of at least one magnetic laminate 105, as shown in FIG. 2 and FIG. 3. Manufacture process 110 (see FIGS. 2-8) of magnetic laminate 105 requires strontium ferrite powder 125 and at least one binder 127, as shown. Magnetic laminate 105 is preferably manufactured non-magnetized. At least one magnetization process 130 preferably occurs to magnetize magnetic laminate 105 after manufacture, as shown.

Some printing processes 140, usually due to hardware limitations, are inhibited in the presence of a magnetic field. When magnetic laminate 105 is printed by printing processes 140, preferably, non-magnetized magnetic laminate 113, comprising magnetic laminate 105 that is not magnetized, is used and magnetization process 130 occurs after printing processes 140, as shown. Magnet-friendly printing processes 150, however, are preferably capable of accepting magnetized magnetic laminate 115, comprising magnetic laminate 105 that is magnetized, and, therefore, magnetization process 130 may preferably occur before magnet-friendly printing processes 150, as shown.

As shown, cutting of magnetic laminate 105 in preprinting cutting process 160 preferably sizes magnetic laminate 105 to accommodate printing processes 140 and magnet-friendly printing processes 150, preferably with acceptable media sizes. Such acceptable media sizes may preferably include letter, legal, A4, 25-foot roll, etc. Post-printing cutting processes 170 preferably cut magnetic laminate 105 into at least one final size of at least one finished magnetic laminate product 175, as shown. Finished magnetic laminate product 175 preferably comprises magnetic business cards, alternately preferably signs, alternately preferably banners, alternately preferably logos, alternately preferably accessories, alternately preferably figures, alternately preferably labels. Upon reading this specification, those with skill in the art will now appreciate that, under appropriate circumstances, considering such issues as future indicia displays, use of magnetically attractive surfaces, etc., other finished magnetic laminate products, such as, for example, vehicle wraps, appliance décor, advertising billboards, etc., may suffice.

FIG. 2 shows a perspective view, illustrating at least one roll 210 of magnetic laminate 105, according to the preferred embodiment of FIG. 1. As shown, roll 210 preferably comprises at least one length of magnetic laminate 105 preferably between about 25 feet and about 1800 feet. Width of roll 210 preferably comprises about 2 feet.

FIG. 3 shows an enlarged edge view of magnetic laminate 105, illustrating the layers of magnetic laminate 105, according to the preferred embodiment of FIG. 1. Magnetic laminate 105 preferably comprises at least one flexible magnet 310 and preferably at least one printable material 320, as shown. Flexible magnet 310 and printable material 320 are preferably laminated together to form magnetic laminate 105, preferably using at least one adhesive 305, as shown. In order to pass through most printers, overall thickness of magnetic laminate 105 preferably comprises less than about 20 mils (about 0.020 inches), preferably less than about 15 mils (about 0.015 inches). Flexible magnet 310 preferably comprises a thickness of less than 15 mils (this arrangement at least embodying herein wherein such at least one homogenous sheet comprises at least one thickness less than about 15 mils thick; and this arrangement at least embodying herein wherein said at least one magnetizable laminate layer comprises at least one thickness less than about 15 mils thick).

Flexible magnet 310 preferably comprises at least one homogeneous material 515, as shown, preferably comprising at least one binder 127 and preferably at least one plurality of ferrous particles 350. Ferrous particles 350 comprise preferably ferrite particles, preferably strontium ferrite particles, preferably high-energy strontium ferrite particles ($SrFe_{12}O_{19}$). High-energy refers to the potential of a magnetizable material to exceed about one million Gauss-Oersted, commonly referred to as Megagauss Oersted ("MGOe"), in magnetic energy, once magnetized (this arrangement at least embodying herein wherein such at least one plurality of magnetizable particles when magnetized comprise a magnetic energy of greater than one Megagauss Oersted). Upon reading this specification, those skilled in the art will now appreciate that, under appropriate circumstances, considering such issues as cost, available materials, etc., other than ferrous particles exhibiting magnetic qualities, such as, for example, non-ferrous magnetic metals, non-ferrous magnetic metal alloys, non-ferrous magnetic compounds, etc., may suffice.

Ferrous particles 350 preferably comprise less than about 20 nanometers each in diameter. Ferrous particles 350 preferably comprise about 91%, by weight, of homogeneous material 515.

Binder 127 comprises preferably Hypalon 45 (chlorosulfonated polyethylene rubber), preferably polyisobutylene ($—(CH_2—C_3H_6)n-$), and preferably ethylene vinyl acetate ($CH_3COOCH{=}CH_2$). By weight of homogeneous material 515: Hypalon 45 preferably comprises about 3.6%; polyisobutylene preferably comprises about 3%; and ethylene vinyl acetate preferably comprises about 2.2%. Upon reading this specification, those skilled in the art will now appreciate that, under appropriate circumstances, considering such issues as cost, future technology, etc., other binder materials, such as, for example, resins, other plastics, etc., may suffice.

When magnetized, flexible magnet 310 preferably comprises a magnetic energy of at least 1.0 MGOe (Megagauss Oersted), preferably about 1.7 MGOe. When magnetized, flexible magnet 310 preferably comprises through-width magnetization, alternately preferably through-thickness magnetization. Upon reading this specification, those skilled in the art will now appreciate that, under appropriate circumstances, considering such issues as, application, magnetization methods, cost, etc., other magnetizations, such as, for example, multi-pole magnetization, double-sided magnetization, match-pole magnetization, two poles on each face magnetization, etc., may suffice.

Printable material 320 preferably comprises plastic, preferably vinyl. Upon reading this specification, those skilled in the art will now appreciate that, under appropriate circumstances, considering such issues as application, cost, available materials, etc., other printable materials, such as for example, cloth, paper, other plastics, etc., may suffice.

Printable material 320 comprises preferably a matte finish, alternately preferably a gloss finish, alternately preferably a high-gloss finish, alternately preferably a wipe-off finish. For best printing quality, the finish is chosen to preferably compliment the printer in which magnetic laminate 105 is printed. Upon reading this specification, those skilled in the art will now appreciate that, under appropriate circumstances, considering such issues as application, cost, available materials, etc., other finishes, such as for example, textured, patterned, antique, etc., may suffice.

Figure 4:
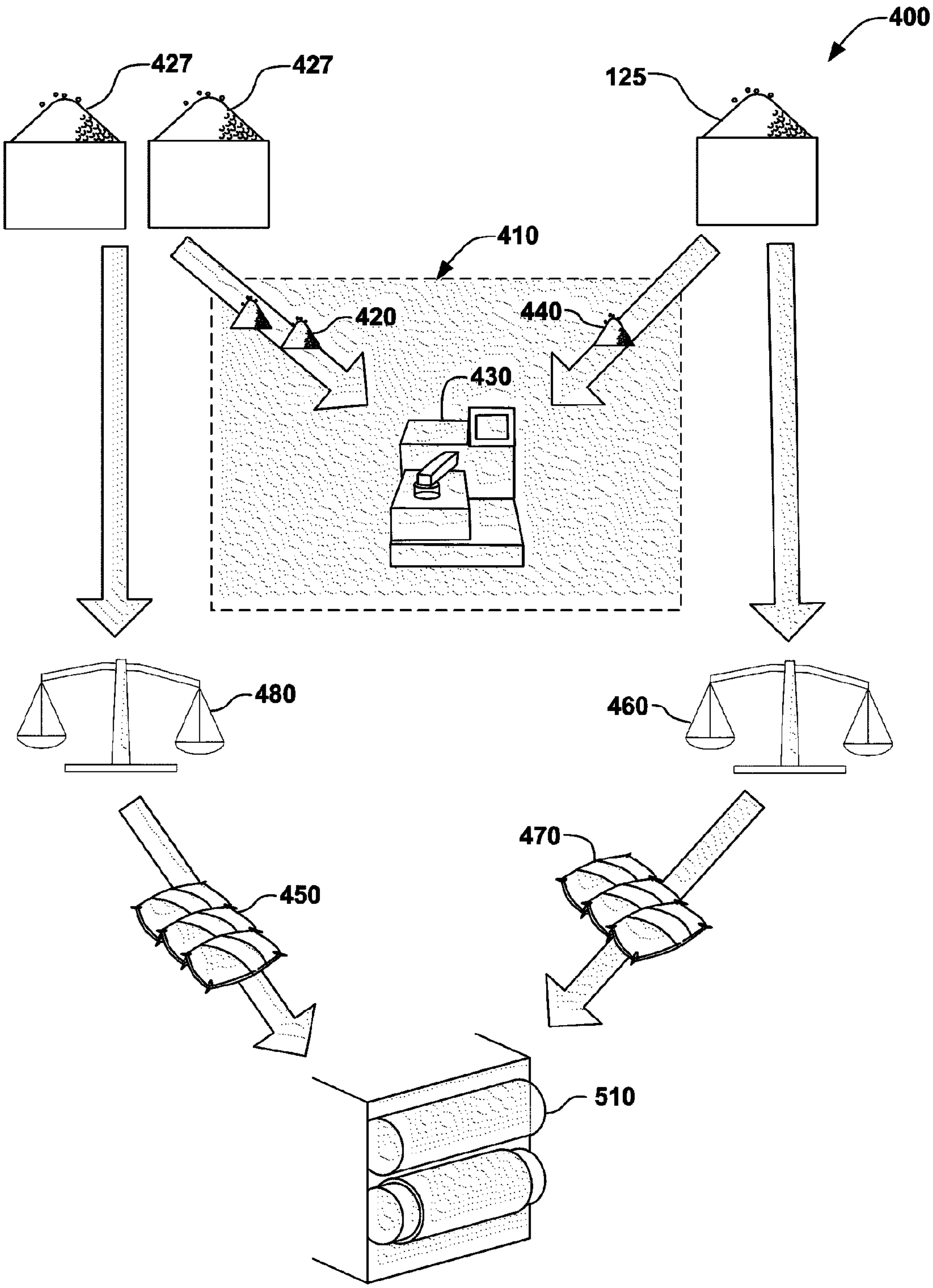
FIG. 4 shows a diagram, illustrating a preferred batching process, according to the preferred embodiment of FIG. 1.

FIG. 4 shows a diagram, illustrating a batching process 400, according to the preferred embodiment of FIG. 1. Flexible magnet 310 preferably is a careful balance of flexibility and magnetic strength. To achieve flexibility, at least one binder component 427 is preferably bound with ferrous particles 350 to form flexible magnet 310, as shown in FIG. 3. Flexible magnet 310 is preferably smooth, preferably flat, preferably flexible and preferably easily cut. To achieve this, each binder component 427 is preferably weighed for an optimal blend to make flexible magnet 310. If the weight of each binder component 427 is not correct, it can cause the sheet to be brittle, magnetically weak, or hard to cut or process.

At the beginning of batching process 400, preferably, at least one incoming quality inspection process 410 occurs, as shown. In incoming quality inspection process 410, preferably, at least one sample 420 of each binder component 427 and, preferably, at least one sample 440 of strontium ferrite powder 125 are scanned through a Differential Scanning Calorimeter 430, as shown, preferably to ensure that the molecular characteristics of the materials are consistent with established standards. The molecular characteristics from binder materials used in the past with a proven performance curve are preferably used as a benchmark for the new incoming binder materials to meet or exceed. Additionally, sample 440 of strontium ferrite powder 125 is preferably checked for particle size, to assure proper magnetic characteristics, using Differential Scanning Calorimeter 430, as shown.

After incoming quality inspection process 410, binder components 427 preferably undergo a weighing and bagging process 480 preferably resulting in at least one bag of binder mix 450, as shown. A plurality of bags of binder mix 450 is then preferably transported to at least one mill 510, as shown, for mixing with strontium ferrite powder 125.

Likewise, strontium ferrite powder 125 preferably undergoes a weighing and bagging process 460 resulting in at least one 50-pound bag 470, as shown. A plurality of 50-pound bags 470 are then preferably transported to mill 510, as shown.

Figure 5:
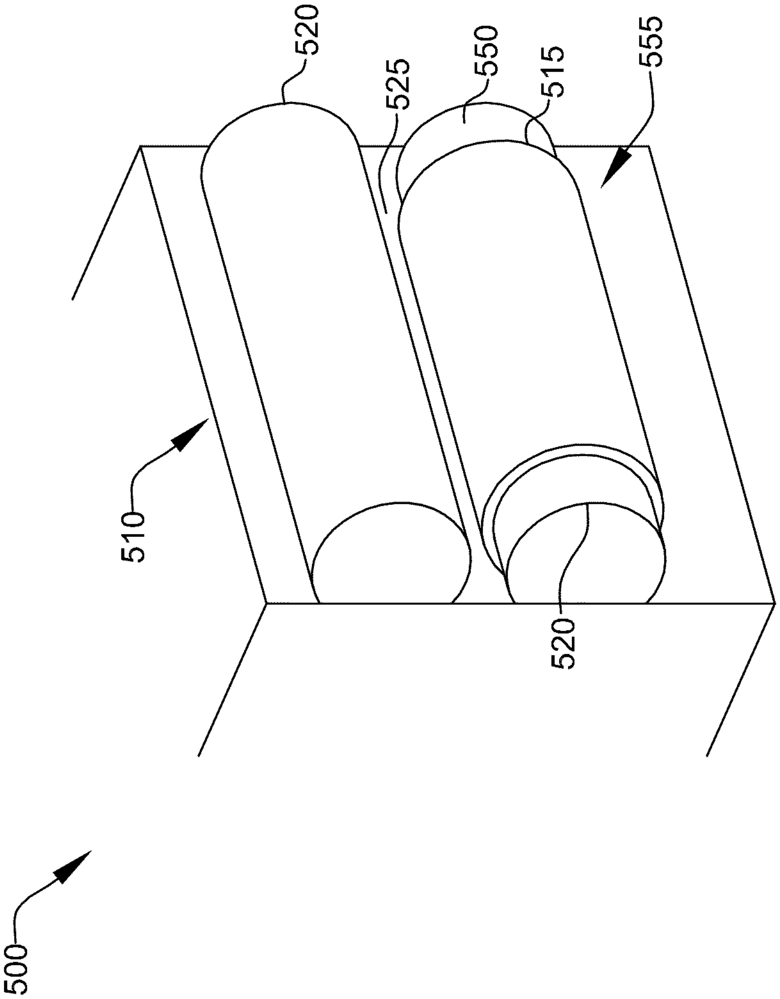
FIG. 5 shows a diagrammatic front perspective view, illustrating a preferred mixing process using at least one mill, according to the preferred embodiment of FIG. 1.

FIG. 5 shows a diagrammatic front perspective view, illustrating mixing process 500 using mill 510, according to the preferred embodiment of FIG. 1. Preferably, mill 510 mechanically mixes binder 127 and strontium ferrite powder 125 together into a homogeneous material 515. Using pressure, friction and heat, mill 510 preferably creates a consistent blend throughout homogeneous material 515.

Mixing process 500 preferably begins with loading binder mix 450 onto at least two cylindrical rolls 520 of mill 510. Cylindrical rolls 520 preferably transfer heat to binder mix 450 through at least one roll face 550 and preferably through pressure at the nip 525, as shown, where such at least two cylindrical rolls are closest. The pressure and heat at nip 525 preferably cause binder mix 450 to break down and form binder 127 (at least embodying herein wherein such at least one magnetizable laminate layer comprises at least one binder material structured and arranged to bind together components of such at least one magnetizable laminate layer). Binder 127 preferably melts and preferably adheres to such at least one roll face 550 in a semi-smooth coating 555, as shown.

At this point, binder 127 is preferably ready to receive ferrous particles 350. Strontium ferrite powder 125, preferably comprising ferrous particles 350 (at least embodying herein wherein such at least one plurality of magnetizable particles consist essentially of strontium ferrite), is preferably added to mill 510 and ferrous particles 350 (at least embodying herein at least one plurality of magnetizable particles held by such at least one binder material) preferably embed into binder 127 (at least embodying herein at least one binder material structured and arranged to bind together components of such at least one homogenous sheet). Mill 510 preferably mixes binder 127 and ferrous particles 350, preferably forming homogeneous material 515.

Figure 6:
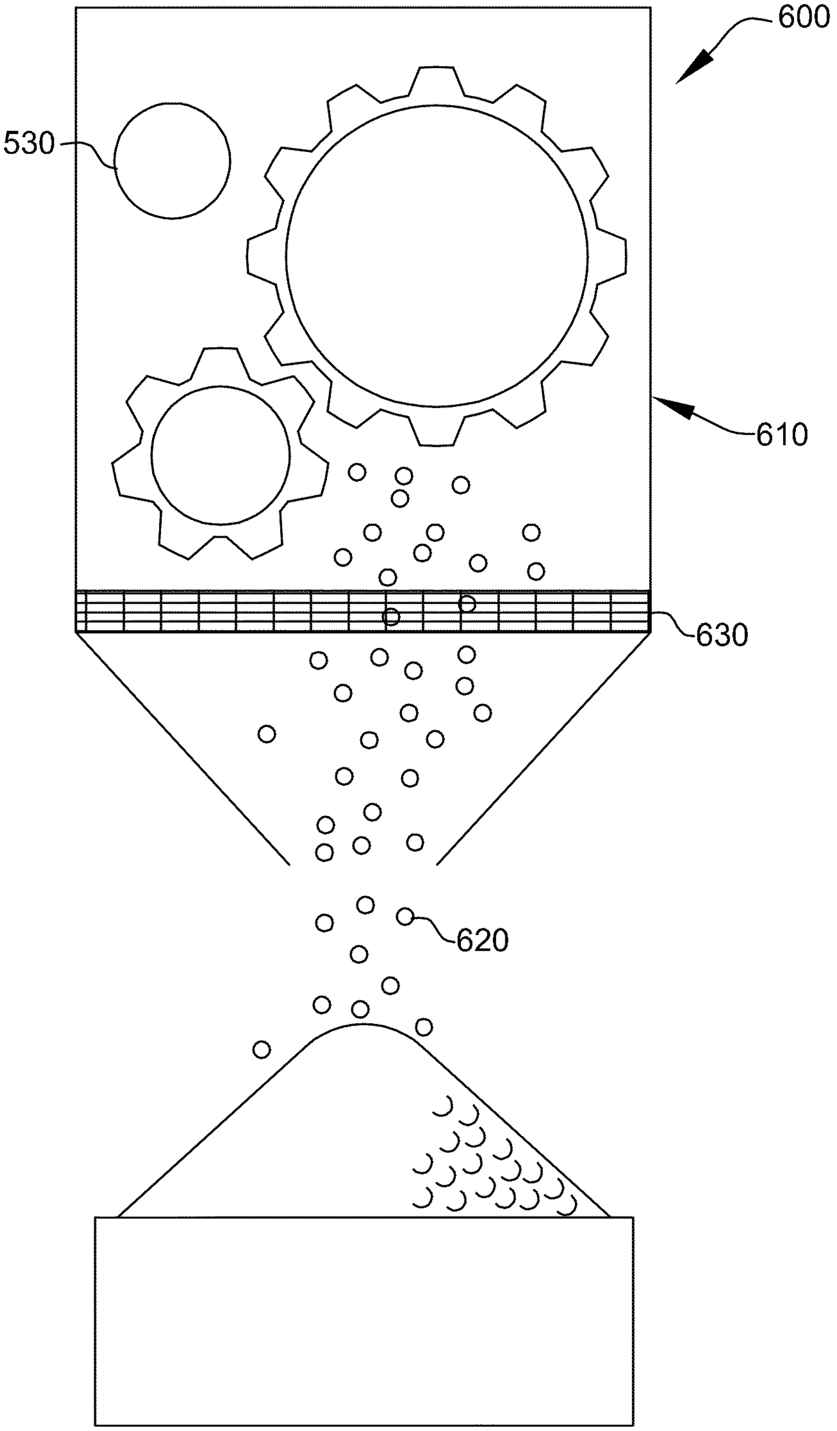
FIG. 6 shows a side diagrammatic view, illustrating a preferred granulating process in at least one granulator, according to the preferred embodiment of FIG. 1.

Once ferrous particles 350 are properly dispersed, homogeneous material 515 is preferably removed from mill 510 in small rolls of homogeneous material 515, commonly known as pigs 530 in the art, which are preferably fed to at least one granulator 610, as shown in FIG. 6.

FIG. 6 shows a side diagrammatic view, illustrating granulating process 600 in granulator 610, according to the preferred embodiment of FIG. 1. Pigs 530 of homogeneous material 515, coming from mill 510, preferably are next granulated, as shown. Particle size is critical to maintaining smoothness in finished magnetic laminate product 175 and processability in calendering process 700. At least one granulator 610 preferably cuts pigs 530 into granular particles 620 and preferably forces granular particles 620 through at least one sizing screen 630, as shown. Granular particles 620 preferably are then ready for use in calendering process 700.

Figure 7:
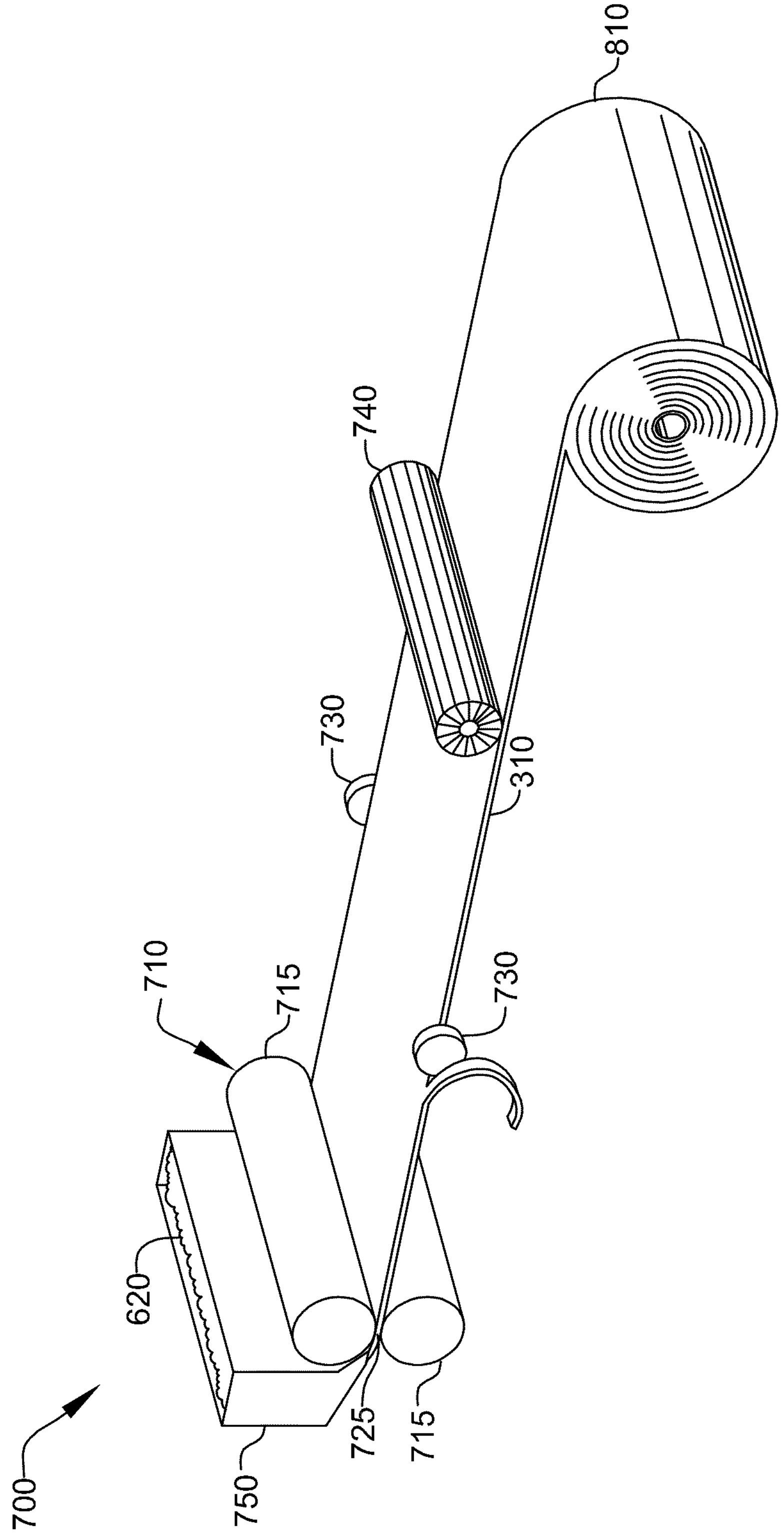
FIG. 7 shows a diagrammatic perspective view, illustrating a preferred calendering process, according to the preferred embodiment of FIG. 1.

FIG. 7 shows a diagrammatic perspective view, illustrating calendering process 700, according to the preferred embodiment of FIG. 1. During calendering process 700, homogeneous material 515 preferably becomes flexible magnet 310, as shown. As shown, granular particles 620 are preferably forced through a calendering nip 725 of at least one calender 710 and preferably bound into a sheet with a predetermined thickness and width.

Granular particles 620 are preferably fed into calender 710 from granular particle bin 750, as shown, preferably making sure the profile of flexible magnet 310 is consistent by evenly distributing granular particles 620 through calendering nip 725. Any contaminants contained in granular particles are preferably removed before feeding into calendering nip 725. At least one quality-check preferably ensures the quality of flexible magnet 310 in terms of thickness, width, smoothness and cleanliness.

Flexible magnet 310 preferably comprises a smooth finish for optimal use in printing processes 140 and magnet-friendly printing processes 150. Problems in quality may result in poor ink adhesion, poor ink coverage and voids where ink will not go down because of blisters, zits, or a generally grainy texture.

The profile of flexible magnet 310 is preferably flat. With inconsistencies in thickness, flexible magnet 310 will not lay flat when finished. Consistent thickness is preferably achieved by careful management of calendering nip 725, the temperature of calender rolls 715 and the shape of calender rolls 715. Calender rolls 715 preferably maintain an even temperature, preferably as well as a smooth circular-cylinder surface. Calendering nip 725 preferably maintains a consistent gap between calender rolls 715.

The thickness of flexible magnet 310 is set and maintained preferably by managing calendering nip 725 between the calender rolls. While moving therethrough, flexible magnet 310 is preferably checked often to insure that the thickness is consistent, preferably both across the profile of flexible magnet 310 and throughout the length of the run.

The width of flexible magnet 310 is preferably controlled by at least one rotating cutter 730, as shown, that is set up to preferably trim flexible magnet 310 to at least one precise width. As shown, at least one nylon rotary brush 740 is preferably used to ensure that loose particles and other contaminants are preferably not wound up with flexible magnet 310 at the end of calendering process 700.

During calendering process 700, the magnetic characteristics, smoothness and thickness of flexible magnet 310 are preferably optimized and fixed and therefore cannot be modified later without destroying flexible magnet 310.

Figure 8:
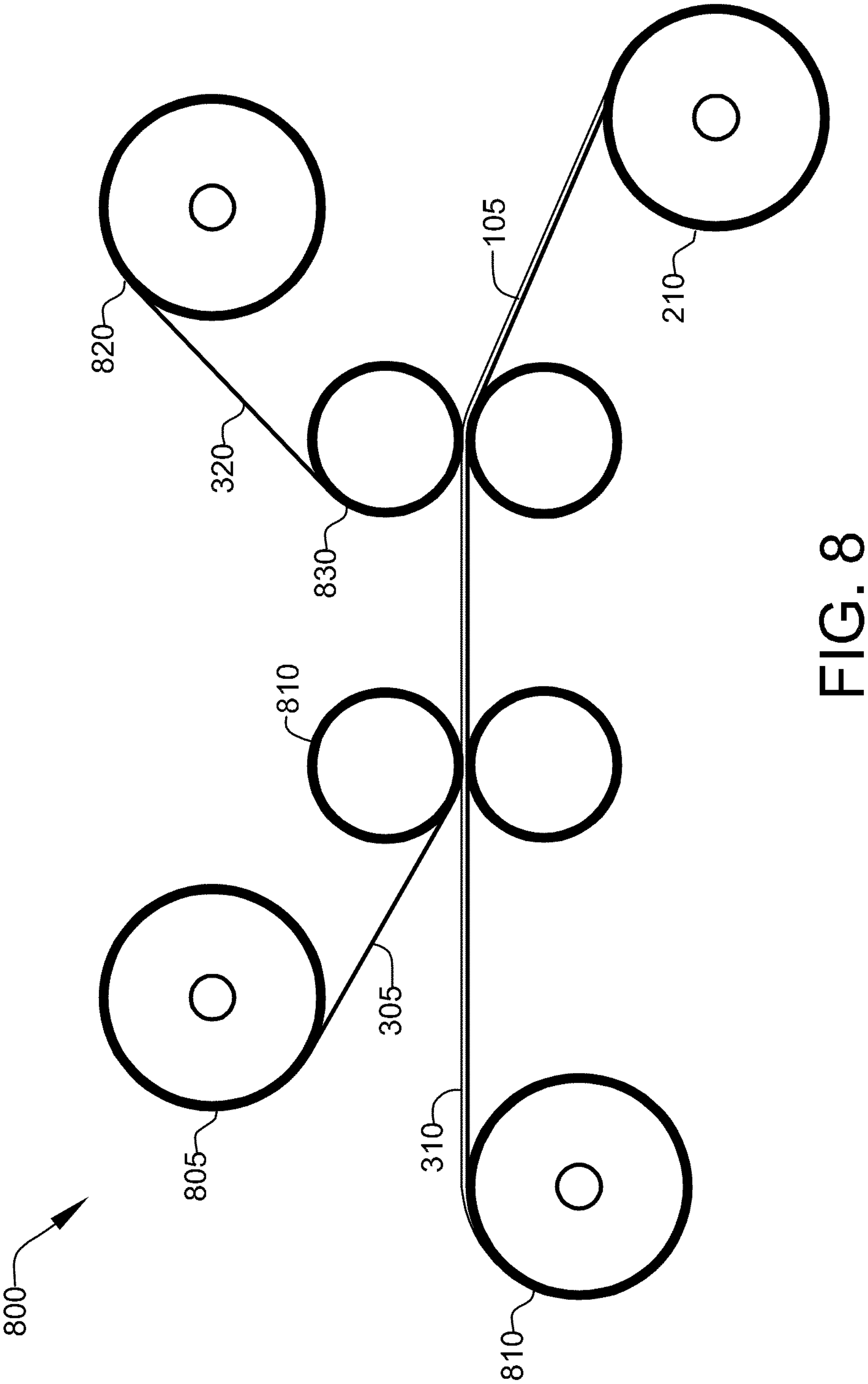
FIG. 8 shows a diagrammatic side view, illustrating a preferred flexible magnet laminating process, according to the preferred embodiment of FIG. 1.

FIG. 8 shows a diagrammatic side view, illustrating a preferred flexible magnet laminating process 800, according to the preferred embodiment of FIG. 1.

At least one flexible magnet laminating process 800 preferably comprises at least one roll 210 of flexible magnet 310, preferably at least one roll 805 of adhesive 305, and preferably at least one roll 820 of printable material 320, as shown.

Flexible magnet 310 is preferably fed into flexible magnet laminating process 800 where adhesive application roller 810 preferably applies adhesive 305 (at least embodying herein at least one attacher laminate layer structured and arranged to attach such at least one magnetizable laminate layer with such at least one printable laminate layer) to flexible magnet 310 (at least embodying herein at least one magnetizable laminate layer), as shown. Printable material 320 (at least embodying herein at least one printable laminate layer) preferably is then applied by at least one printable material application roller 830 onto adhesive 305.

Adhesive 305 preferably is heated to activate adhesive qualities. After adhesive 305 cools and lamination is set, magnetic laminate 105 is preferably rolled up forming roll 210 (at least embodying herein wherein such at least one laminate comprises at least one roll), as shown.

Figure 9:
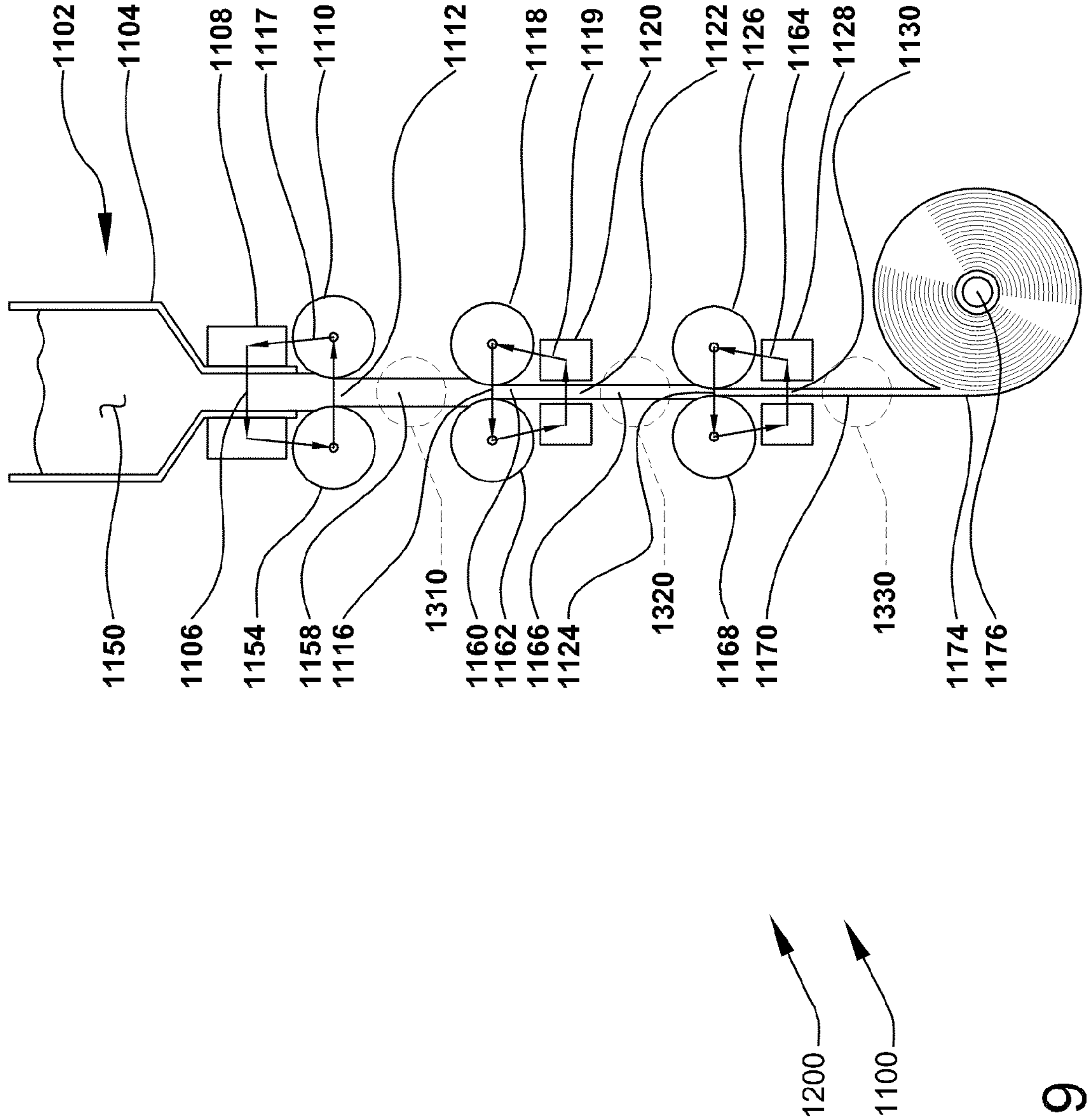
FIG. 9 shows a schematic view, illustrating a preferred magnetically orienting magnetic-particle process, according to a preferred embodiment of the present invention.

FIG. 9 shows a schematic view, illustrating a preferred magnetically orienting magnetic-particle process 1100, according to a preferred embodiment of the present invention. Flexible magnetic film 1170 preferably comprises tabular magnetic-particles 1202 and polymer matrix 1204. FIG. 9 particularly illustrates magnetic aligning and plastic aligning of tabular magnetic-particles 1202 within polymer matrix 1204. Manufacturing process 1200 preferably produces oriented-magnetic-particle roll-form 1174 of flexible magnetic film 1170. Oriented-magnetic-particle roll-form 1174 preferably is further processed via finishing process 1500 to produce oriented-magnetic-particle consumable product 1540 (see FIG. 13) comprising flexible magnetic film 1170. Flexible magnetic film 1170 preferably comprises a maximum energy product of less than about 0.9 MGOe, a remanence of less than about 2 kG and a coercive force of less than about 1.8 kOe.

Persons, skilled in the art of manufacturing of flexible magnetic materials, substantially know the makeup of tabular magnetic-particles 1202 within polymer matrix 1204. Magnetic attributes of the makeup of flexible magnetic film 1170 preferably comprise high remanent-magnetization and high coercive-field, while maintaining a degree of flexibility required by finishing process 1500 and by users of flexible magnetic film 1170. These magnetic properties preferably are provided by ferrite particles having a hexagonal magnetoplumbite structure (and forming tabular magnetic-particles). Further, these magnetic properties preferably are based on compositions of $XO.6Fe_2O_3$, where X preferably is barium (Ba) or alternately preferably strontium (Sr), Fe is iron, and O is oxygen (at least embodying herein wherein such magnetizable particles comprise at least one ferrite having magnetic properties based on compositions of $BaO.6Fe_2O_3$, where Ba is barium, Fe is iron, and O is oxygen; and at least embodying herein wherein such magnetizable particles comprise at least one ferrite having magnetic properties based on compositions of $SrO.6Fe_2O_3$, Sr is strontium, Fe is iron, and O is oxygen).

Polymer matrix 1204 preferably comprises at least one thermoplastic, preferably having a melting point that is useful both during calendering processes and as desired by users. More preferably, polymer matrix 1204 comprises at least one thermoplastic, preferably having a melting point melting point between about 100 degrees Celsius to about 350 degrees Celsius, and that is useful during calendering processes. Additionally, preferably polymer matrix 1204 comprises at least one thermoplastic, preferably having a melting point between about 100 degrees Celsius to about 350 degrees Celsius, and that has useful applications between about 0 degrees Celsius to about 100 degrees Celsius.

Polymer matrix 1204 preferably comprises polyvinyl, alternatively preferably, comprises polyurethanes, alternatively preferably, comprises polyamides, alternatively preferably, comprises polyesters, alternatively preferably, comprises acrylics, alternatively preferably, comprises copolymers of vinyl and urethane, alternatively preferably, comprises copolymers of urethane and acrylic, and, alternatively preferably, comprises copolymers of vinyl and acrylic. Polymer matrix 1204 further, alternatively preferably, comprises at least one polymer exhibiting thixotropic properties in the sense that the polymers undergo severe shearing when subjected to light shear loading and reestablish viscoelasticity after short rest-periods (at least embodying herein wherein such binder material comprises at least one slurry substantially comprising thixotropic properties). Polymer matrix 1204 exhibiting thixotropic properties preferably comprises either carbamate in an n-alkane (n-octane or n-dodecane) or carbamate in ethyl acetate.

Further, preferably, polymer matrix 1204 contains at least one wetting agent that improves wetting of the molten thermoplastic to tabular magnetic-particles 1202. Such at least one wetting agent preferably comprises the class of surface active agents that decreases the cohesion within polymer matrix 1204 and increases the adhesive force between polymer matrix 1204 and tabular magnetic-particles 1202.

Still further, preferably, polymer matrix 1204 contains at least one dispersing agent that improves wetting of the molten thermoplastic to tabular magnetic-particles 1202. Such at least one dispersing agent preferably comprises the class of surface-active agents that improves the separation of tabular magnetic-particles 1202 within polymer matrix 1204. The at least one wetting agent and at least one dispersing agent are preferably selected to facilitate wet-out and dispersion of tabular magnetic-particles 1202 within flexible magnetic film 1170.

The weight ratio of tabular magnetic-particles 1202 to polymer matrix 1204 within flexible magnetic film 1170, preferably, for purposes of reducing costs of production, is about 30 percent to about 75 percent by weight of tabular magnetic-particles 1202 with about 25 percent to about 70 percent by weight of polymer matrix 1204. More preferably, the weight ratio of tabular magnetic-particles 1202 to polymer matrix 1204 within flexible magnetic film 1170 is about 55 percent to about 75 percent by weight of tabular magnetic-particles 1202 with about 25 percent to about 45 percent by weight of polymer matrix 1204. Further, more preferably, the weight ratio of tabular magnetic-particles 1202 to polymer matrix 1204 within flexible magnetic film 1170 is about 65 percent to about 75 percent by weight of tabular magnetic-particles 1202 with about 25 percent to about 35 percent by weight of polymer matrix 1204. Additionally, the weight ratio of tabular magnetic-particles 1202 to polymer matrix 1204 preferably is adjusted consistent with magnetic properties of flexible magnetic film 1170 desired by users. Optimal weight ratios, to achieve predetermined magnetic properties of flexible magnetic film 1170, are a function of individual characteristics of tabular magnetic-particles 1202 and the relative orientation of tabular magnetic-particles 1202 within flexible magnetic film 1170.

Persons skilled in the art of manufacturing of flexible magnetic materials utilize magnetic film making processes that focus to weight ratios of magnetic-particles to polymer matrix wherein the magnetic-particles are randomly arranged within the polymer matrix. Due to randomly oriented magnetic-particles, these processes result in weight ratios of magnetic-particles to polymer matrix substantially higher than the weight ratio of aligned tabular magnetic-particles 1202 to polymer matrix 1204 within similarly capable flexible magnetic film 1170. Thus, the aligning of tabular magnetic-particles 1202 within polymer matrix 1204 of flexible magnetic film 1170 results in reducing the relative loading of tabular magnetic-particles 1202 necessary to achieve characteristics of flexible magnetic film 1170 desired by users.

Additionally, traditional processes for making magnetic film focus to weight ratios of magnetic-particles to polymer matrix wherein the size of magnetic-particles are not primarily selected to maximize the benefits of both coercive field of the tabular magnetic-particles and relative orienting of the tabular magnetic-particles within magnetic films. Such traditional processes, wherein sizing of the magnetic-particles does not maximize the coercive field of the tabular magnetic-particles, result in weight ratios of the magnetic-particles to polymer matrix substantially higher than the weight ratio of tabular magnetic-particles 1202 to polymer matrix 1204 within similarly capable flexible magnetic film 1170. Thus, the aligning of properly sized tabular magnetic-particles 1202 within polymer matrix 1204 of flexible magnetic film 1170 results in reducing the relative loading of tabular magnetic-particles 1202 necessary to achieve characteristics of flexible magnetic film 1170 desired by users.

Flexible magnetic film 1170 reduces the use of tabular magnetic-particles 1202 by both: optimizing the individual magnetic characteristics of tabular magnetic-particles 1202; and aligning the relative orientation of tabular magnetic-particles 1202 within flexible magnetic film 1170. Such optimizing results in lowering the unit-area cost of flexible magnetic film 1170 while achieving characteristics of flexible magnetic film 1170 desired by users. Additionally, such optimizing allows the thickness of flexible magnetic film 1170 to be reduced into ranges wherein flexible magnetic film 1170 may be utilized in traditional printing and finishing processes in a manner similar as paper-based roll-forms and sheet-forms. Such reduced thickness flexible magnetic film 1170 may be further optimized, for traditional printing and finishing processes, by demagnetizing processes during their manufacture. These demagnetizing processes are discussed below.

Figure 11:
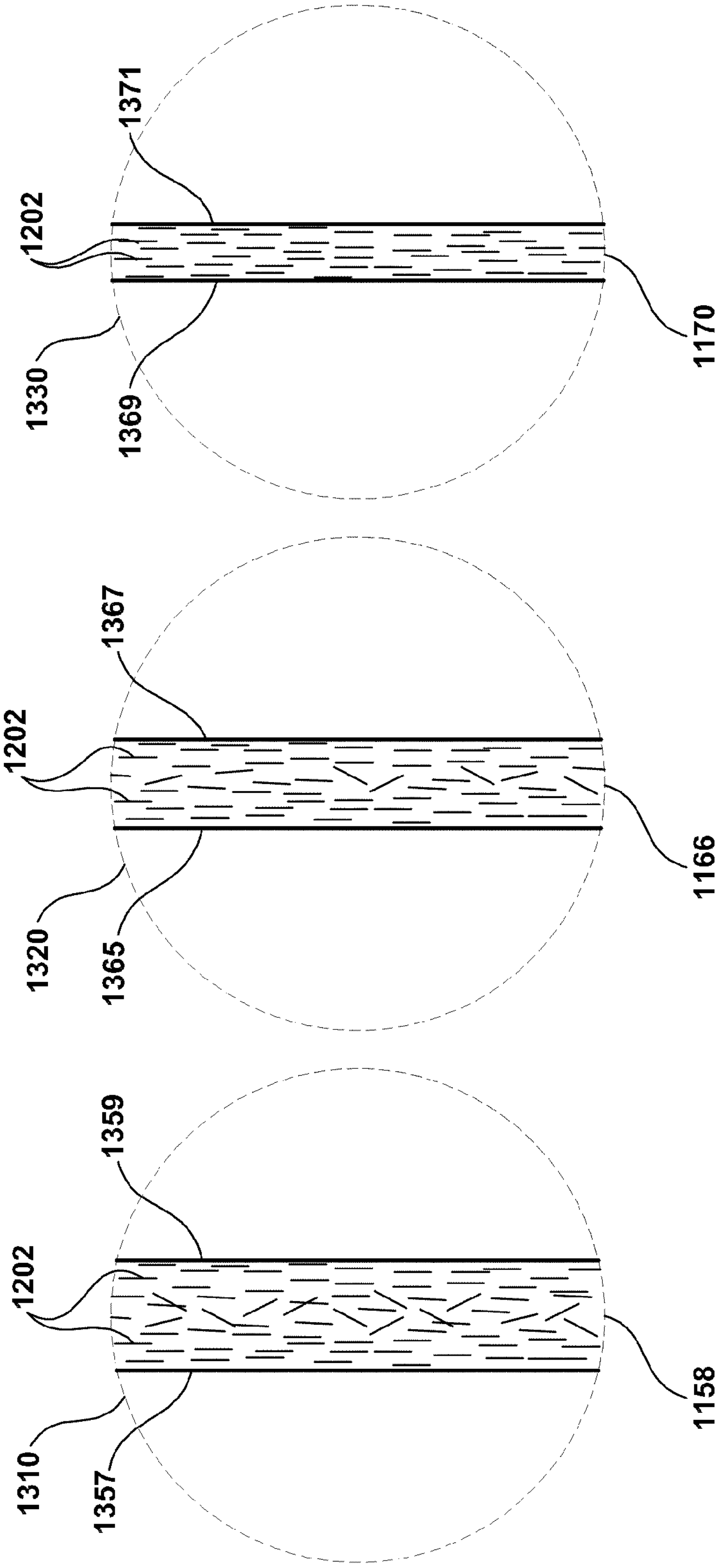
FIG. 11 shows cross-sectional views, illustrating cross-sectional characteristics of oriented magnetic-particles after magnetic aligning and plastic aligning of magnetic-particles within preferred magnetically orienting magnetic-particle process, according to a preferred embodiment of the present invention.

Optimizing geometry and size range of tabular magnetic-particles 1202 within the context of manufacturing process 1200 requires tabular magnetic-particles 1202 preferably comprising planar geometries that are readily susceptible to plastic aligning-processes within polymer matrix 1204. Thus, tabular magnetic-particles 1202 preferably comprise planar geometries that are plate-like, as shown. Additionally, at least one major dimension of the preferably planar geometry of tabular magnetic-particles 1202 preferably approaches a significant fraction of the thickness of flexible magnetic film 1170, as shown. (The at least one major dimension of tabular magnetic-particles 1202, shown in FIG. 11, are not to scale, but rather are elongated to better depict their orientations.) In addition, tabular magnetic-particles 1202 preferably have strength characteristics substantially capable of surviving, without substantial fracturing, multiple magnetic alignments and plastic-alignments within polymer matrix 1204, as imposed by manufacturing process 1200. This is aided by selecting calendering temperatures wherein polymer matrix 1204 viscosity preferably ranges from about 20 centipose to about 2000 centipose, and more preferably ranges from about 80 centipose to about 300 centipose. The calendering temperature preferably is always between the solidus temperature and liquidus temperature of polymer matrix 1204. More preferably, the calendering temperature preferably approaches the liquidus temperature of polymer matrix 1204.

Tabular magnetic-particles 1202 preferably are mixtures of $Fe_2O_3$ and $BaCO_3$ or $Fe_2O_3$ and $SrCO_3$. Tabular magnetic-particles 1202 preferably are sintered such that the easy axis of magnetization of the resulting ceramic is normal to their larger surfaces. Persons skilled in the arts of magnetic materials substantially know the art of orienting the easy axis of magnetization within sintered ceramics of $Fe_2O_3$ and $BaCO_3$ or $Fe_2O_3$ and $SrCO_3$. Once the sintered ceramics are formed, the ceramic particles may be milled to form tabular magnetic-particles 1202. The milling processes, preferably ball milling, preferably continue until tabular magnetic-particles 1202 are reduced to a desired size range. The desired size range is determined by maximizing the coercive field of tabular magnetic-particles 1202. The desired size range also minimizes the weight ratio of tabular magnetic-particles 1202 within polymer matrix 1204 that is necessary to achieve characteristics of flexible magnetic film 1170 desired by users. Such minimum weight ratio also minimizes the cost of flexible magnetic film 1170 necessary to achieve these same user desired characteristics of flexible magnetic film 1170.

Applicant has determined the desired size of tabular magnetic-particles 1202 ranges from about 20 micro-inches to about 100 micro-inches (at least embodying herein wherein such magnetizable particles comprise essentially a major-dimension particle-size range of about 20 micro-inches to about 100 micro-inches). Applicant has also determined commercially viable thicknesses of flexible magnetic film 1170 are greater than about 1000 micro-inches. And, at least one major dimension of the preferably planar geometry of tabular magnetic-particles 1202 preferably approaches a significant fraction of the thickness of flexible magnetic film 1170. Thus, tabular magnetic-particles 1202 are preferably milled such that the resulting sizes range within the upper portions of the size range that maximizes the coercive field of tabular magnetic-particles 1202.

Manufacturing process 1200 preferably comprises a continuous process. Manufacturing process 1200 preferably converts flexible magnetic film material 1150 into flexible magnetic film 1170, spooled onto take-up reel 1176. Manufacturing process 1200 preferably assists orienting the larger surfaces of tabular magnetic-particles 1202 with respect to first surface 1369 and second surface 1371 of flexible magnetic film 1170 (also see FIG. 11). Applicant has found that such relative orientation of the larger surfaces of tabular magnetic-particles 1202 parallel to first surface 1369 and second surface 1371 of flexible magnetic film 1170 also orients the easy direction of magnetization of tabular magnetic-particles 1202. This tends to allow flexible magnetic film 1170 to achieve substantially higher levels of magnetic strength for a given weight ratio of tabular magnetic-particles 1202 to total weight of flexible magnetic film 1170.

Manufacturing process 1200 preferably accomplishes orienting the larger surfaces of tabular magnetic-particles 1202 parallel to first surface 1369 and second surface 1371 of flexible magnetic film 1170 by a series of magnetic aligning and plastic aligning processes. The initial magnetic aligning process occurs after flexible magnetic film material 1150, which makes up flexible magnetic film 1170, is liquefied in calender vat 1104 of calender 1102. Immediately after liquefied flexible magnetic film material 1150 feeds from calender vat 1104, and just prior to flexible magnetic film material 1150 feeding between calender roller 1154 and calender roller 1110, flexible magnetic film material 1150 is subjected to first magnetic field 1106. First magnetic field 1106 is created by first aligning magnet 1108 and comprises a portion of first magnetic circuit 1117. The field strength of first magnetic field 1106 is adjusted to be sufficiently strong to cause magnetic orienting of tabular magnetic-particles 1202 normally to first magnetic field 1106. The field strength of first magnetic field 1106 preferably is about 10 kOe to about 16 kOe.

Figure 10:
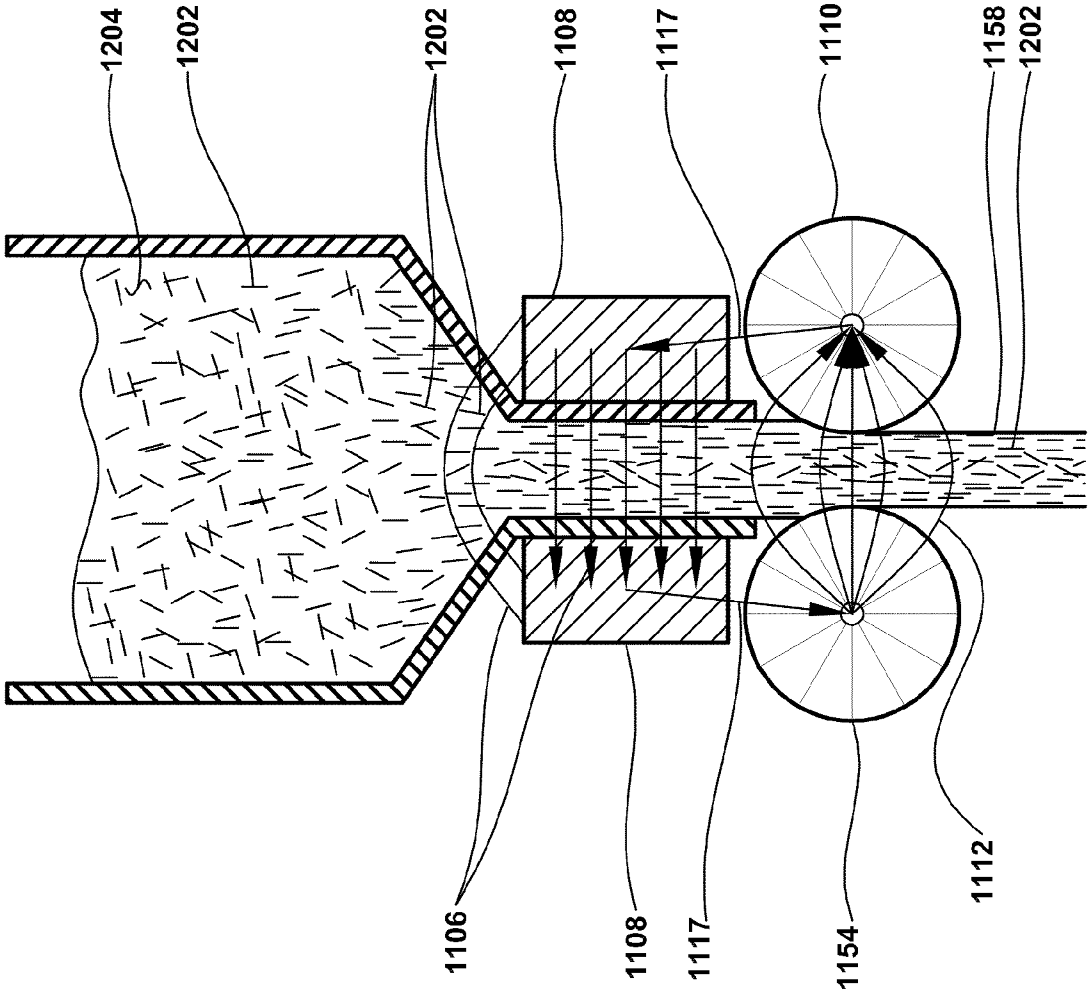
FIG. 10 shows a schematic view, illustrating a preferred initial calendering portion of preferred magnetically orienting magnetic-particle process, according to a preferred embodiment of the present invention.

As flexible magnetic film material 1150 continues through the nip between calender roller 1154 and calender roller 1110, flexible magnetic film material 1150 is subjected to first demagnetizing field 1112. First demagnetizing field 1112 is created by calender roller 1154 and calender roller 1110, which are segmented as shown in FIG. 10. First aligning magnet 1108, calender roller 1154 and calender roller 1110 together complete first magnetic circuit 1117, as shown. The field strength of first demagnetizing field 1112 preferably is about 10 kOe to about 16 kOe.

Additionally, flexible magnetic film material 1150 preferably continues through the nip between calender roller 1154 and calender roller 1110, where the initial plastic aligning process occurs. Here, as applicant has determined, the strong shearing action associated with thinning flexible magnetic film material 1150 tends to plastically align tabular magnetic-particles 1202 along the length of flexible magnetic film material 1150. Thus, the combination of the first magnetic orienting, enacted by first magnetic circuit 1117, and the first plastic aligning, enacted by the shearing action at the nip between calender roller 1154 and calender roller 1110, tends to orient the larger surfaces of tabular magnetic-particles 1202 parallel to first surface 1357 and second surface 1359 (see FIG. 11) of initially calendered magnetic film 1158, as shown. A representative cross-section of initially calendered magnetic film 1158 is shown in FIG. 11. Thickness of magnetic film 1158 preferably ranges from about 40,000 micro-inches to about 100,000 micro-inches.

Manufacturing process 1200 next preferably requires that initially calendered magnetic film 1158 continue through the nip between calender roller 1162 and calender roller 1118. During this action, magnetic film 1158 is subjected to second magnetizing field 1116 (at least embodying herein at least one shaping of such at least one configurable mix to provide at least one intermediate configuration promoting magnetizing of such magnetizable particles). The field strength of second magnetizing field 1116 preferably is about 12 kOe to about 18 kOe (at least embodying herein at least one magnetizing of such at least one intermediate configuration). Calender roller 1162 and calender roller 1118 are segmented, such that they create second magnetizing field 1116, similarly to calender roller 1110 and calender roller 1154 as shown in FIG. 10. Additionally, as magnetic film 1158 continues through the nip between calender roller 1162 and calender roller 1118, a second plastic aligning process occurs. Here, the strong shearing action associated with thinning magnetic film 1158 tends to further plastically align tabular magnetic-particles 1202 along the length of magnetic film 1158, transforming magnetic film 1158 into the thinner magnetic film 1166, as shown (second plastic alignment). Thus, the combination of a second magnetic orienting, enacted by second magnetizing field 1116, and a second plastic aligning, enacted by the shearing action at the nip between calender roller 1162 and calender roller 1118, tends to further orient the larger surfaces of tabular magnetic-particles 1202 parallel to first surface 1365 and second surface 1367 (see FIG. 11) of the calendered magnetic film 1166. A representative cross-section of magnetic film 1166, depicting the further orienting of tabular magnetic-particles 1202, is also shown in FIG. 11.

Magnetic film 1166 preferably is significantly thinner than magnetic film 1158. Thickness of magnetic film 1166 preferably ranges from about 10,000 micro-inches to about 30,000 micro-inches. At this point in manufacturing process 1200, magnetic film 1166 has been magnetized by second magnetic circuit 1119, as shown. Thus, next, magnetic film 1166 is demagnetized by second demagnetizing field 1122, which is created by second aligning magnets 1120 (at least embodying herein wherein essentially each such at least one magnetizing step is followed by at least one de-magnetizing step). Second aligning magnets 1120 in conjunction calender roller 1162 and calender roller 1118 comprise a second magnetic circuit 1119. Second demagnetizing field 1122 is adjusted to be sufficiently strong to cause magnetic orienting of tabular magnetic-particles 1202, normally to second magnetizing field 1116, as magnetic film 1166 is calendered through, as shown. The field strength of second demagnetizing field 1122 preferably is about 12 kOe to about 18 kOe.

Next, manufacturing process 1200 preferably requires that calendered magnetic film 1166 continue through the nip between calender roller 1168 and calender roller 1126. During this action, magnetic film 1166 is subjected to third magnetizing field 1124. Third magnetizing field 1124 is created by calender roller 1168 and calender roller 1126. Calender roller 1168 and calender roller 1126 are segmented similarly to calender roller 1110 and calender roller 1154 as shown in FIG. 10, such that they create third magnetizing field 1124, as shown. The field strength of third magnetizing field 1124 preferably is about 14 kOe to about 18 kOe. Additionally, as magnetic film 1166 continues through the nip between calender roller 1168 and calender roller 1126, a third plastic aligning process occurs. Here, the strong shearing action associated with thinning magnetic film 1166 tends to further plastically align tabular magnetic-particles 1202 along the length of the magnetic film, transforming magnetic film 1166 into the thinner flexible magnetic film 1170, as shown (second plastic alignment). The combination of a third magnetic orienting, enacted by third magnetizing field 1124, and a third plastic aligning, enacted by the shearing action at the nip between calender roller 1168 and calender roller 1126, tends to orient the larger surfaces of tabular magnetic-particles 1202 parallel to first surface 1369 and second surface 1371 of the calendered flexible magnetic film 1170, as shown in FIG. 11. A representative cross-section of calendered flexible magnetic film 1170, showing further alignment of tabular magnetic-particles 1202, is also shown in FIG. 11.

Thickness of flexible magnetic film 1170 preferably ranges from about 1000 micro-inches to about 10,000 micro-inches. At this point in manufacturing process 1200, flexible magnetic film 1170 has been magnetized by third magnetizing field 1124, as shown. Thus, next, flexible magnetic film 1170 is demagnetized by third demagnetizing field 1130, which is created by third aligning magnets 1128. The field strength of third demagnetizing field 1130 preferably is about 14 kOe to about 18 kOe. Third aligning magnets 1128, in conjunction calender roller 1168 and calender roller 1126, comprise a third magnetic circuit 1164.

Finally, manufacturing process 1200 preferably rolls flexible magnetic film 1170 onto take-up reel 1176, as magnetic film roll-form 1174. Magnetic film roll-form 1174 preferably is available as input to finishing process 1500 (see FIG. 13), alternately preferably in flexible magnet laminating process 800 in place of at least one roll 210 of flexible magnet 310, or alternately preferably as finished goods shippable to users.

FIG. 10 shows a schematic view, illustrating a preferred initial calendering portion of manufacturing process 1200, according to a preferred embodiment of the present invention. FIG. 10 particularly shows the successive stages of relative alignment of tabular magnetic-particles 1202 within polymer matrix 1204 as the mixture is first subjected to magnetic aligning and then to plastic aligning.

FIG. 11 shows cross-sectional views, illustrating cross-sectional characteristics of oriented magnetic-particles after magnetic aligning and plastic aligning of tabular magnetic-particles 1202 within manufacturing process 1200, according to a preferred embodiment of the present invention. FIG. 11 further shows the progression of the relative alignment of tabular magnetic-particles 1202 within polymer matrix 1204. Tabular magnetic-particles 1202 are shown larger than actual size to better teach the relative geometries of tabular magnetic-particles 1202 within polymer matrix 1204.

Cross-section 1310 shows initially calendered magnetic film 1158, having a thickness preferably ranging from about 40,000 micro-inches to about 100,000 micro-inches. Tabular magnetic-particles 1202 nearer the outer skins of initially calendered magnetic film 1158 are most aligned with first surface 1357 and second surface 1359 of magnetic film 1158, as shown. Tabular magnetic-particles 1202 nearer the center portion of magnetic film 1158 are randomly aligned with first surface 1357 and second surface 1359 of magnetic film 1158, as shown.

Next, cross-section 1320 shows subsequently calendered magnetic film 1166, having a thickness preferably ranging from about 10,000 micro-inches to about 30,000 micro-inches. Tabular magnetic-particles 1202 nearer the outer skins of initially calendered magnetic film 1166 are more highly aligned with first surface 1365 and second surface 1367 of magnetic film 1166, as shown. Tabular magnetic-particles 1202 nearer the center portion of magnetic film 1166 are less randomly aligned with first surface 1365 and second surface 1367 of magnetic film 1166, as shown.

Finally, cross-section 1330 shows subsequently calendered flexible magnetic film 1170, having a thickness preferably ranging from about 1,000 micro-inches to about 10,000 micro-inches. Tabular magnetic-particles 1202 nearer the outer skins of initially calendered flexible magnetic film 1170 are highly aligned with first surface 1369 and second surface 1371 of flexible magnetic film 1170, as shown. Tabular magnetic-particles 1202 nearer the center portion of flexible magnetic film 1170 are weakly aligned with first surface 1369 and second surface 1371 of flexible magnetic film 1170, as shown.

Figure 12:
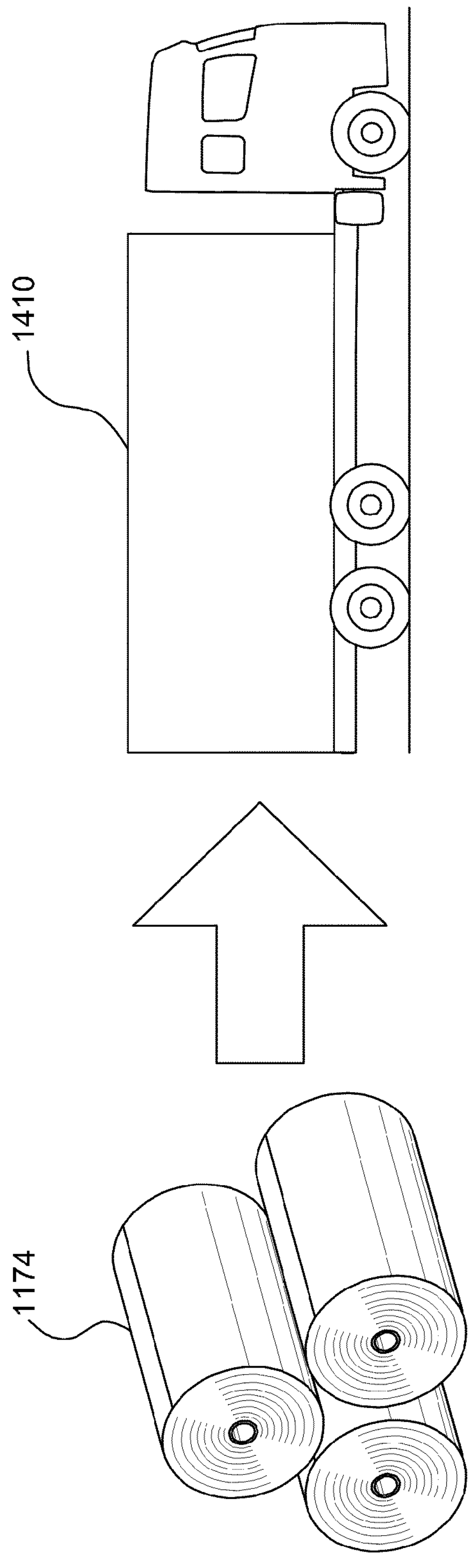
FIG. 12 shows a schematic view, illustrating transporting of roll-forms resulting from preferred magnetically orienting magnetic-particle process, according to a preferred embodiment of the present invention.

FIG. 12 shows a schematic view, illustrating transporting of roll-forms of the oriented magnetic-particle systems, according to a preferred embodiment of the present invention. Flexible magnetic film 1170 preferably packaged as magnetic film roll-form 1174 preferably is transported, preferably by transporter process 1410, from location of processing, preferably by manufacturing process 1200, to location of finish processing, preferably by finishing process 1500 (See FIG. 13).

Figure 13:
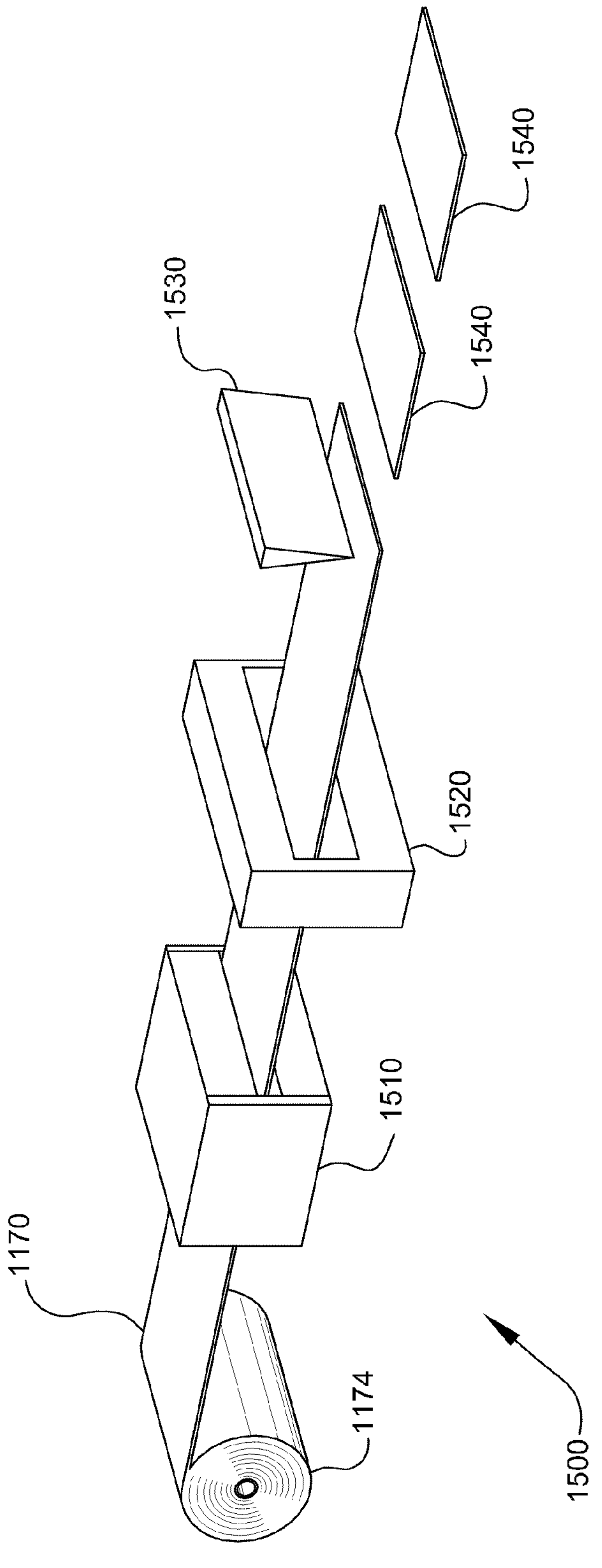
FIG. 13 shows a schematic view, illustrating preferred processing of roll-forms resulting from preferred magnetically orienting magnetic-particle process, according to a preferred embodiment of the present invention.

FIG. 13 shows a schematic view, illustrating preferred processing of magnetic film roll-form 1174, according to a preferred embodiment of the present invention. Finishing process 1500 (also shown herein as magnetization process 130, printing processes 140, Magnet-friendly printing processes 150, preprinting cutting process 160, and post-printing cutting processes 170 of FIG. 1) preferably comprises a continuous, or, alternatively preferably, semi-continuous, series of steps wherein magnetic film roll-form 1174 is converted to at least one consumable product of value to at least one user. FIG. 13 shows magnetic film roll-form 1174 racked in a production-line-like process wherein flexible magnetic film 1170 may be reeled from magnetic film roll-form 1174 through a series of value-added processes that preferably comprise at least one laminating/printing process 1510, at least one magnetizing process 1520, and at least one shaping process 1530. The preferred output of finishing process 1500 is at least one consumable product 1540 for at least one user. Consumable product 1540 preferably may comprise processed flexible magnetic film 1170, preferably laminated, alternatively preferably printed, alternatively preferably shaped, alternatively preferably coined.

Characteristics of flexible magnetic film 1170 preferably comprise its relative thinness and demagnetized state, wherein flexible magnetic film 1170 may preferably be utilized as input into a wide variety of modern high-speed laminating processes (such as flexible magnet laminating process 800). Such laminating processes preferably comprise processes laminating roll-fed non-magnetized substrates having thicknesses less then about 1000 micro-inches. Such laminating processes preferably comprise processes laminating roll-fed non-magnetized substrates utilizing surface re-melt of polymer matrix 1204 to act as an adhesive to adhere compatible laminating sheets to flexible magnetic film 1170. Compatible laminating sheets preferably comprise film layers that add functionality to flexible magnetic film 1170. Such added functionality to flexible magnetic film 1170 preferably comprise printable surface characteristics, alternately preferably writeable characteristics, alternatively preferably comprise at least one pre-printed indicia, alternatively preferably comprise at least one permeability barrier layer, alternatively preferably comprise at least one adhesive layer, alternatively preferably comprise at least one weatherizing layer, alternatively preferably comprise at least one armorizing layer, alternatively preferably comprise at least one sealing layer, or alternatively preferably comprise at least one electrical circuit layer.

Further characteristics of flexible magnetic film 1170 preferably comprise its relative thinness and demagnetized state, wherein flexible magnetic film 1170 may be utilized as input into a wide variety of modern high-speed printing processes. Such printing processes preferably comprise processes requiring roll-fed non-magnetized substrates having thicknesses less than about 1000 micro-inches. Such printing processes preferably comprise lithography, alternatively preferably comprise xerography, alternatively preferably comprise roller printing, alternatively preferably comprise screen-printing.

Additional characteristics of flexible magnetic film 1170 preferably comprise its ability to readily convert from a de-magnetized state to a magnetized state in at least one continuous format, such as the continuously fed roll-form. Such magnetizing processes preferably comprise processes magnetizing roll-fed non-magnetized substrates having thicknesses less than about 1000 micro-inches.

Still additional characteristics of flexible magnetic film 1170 preferably comprise its ability to be shaped by high-speed-shaping processes that are adapted to continuously feed roll-form substrates. Such shaping processes preferably comprise processes shaping roll-fed non-magnetized substrates having thicknesses less then about 1000 micro-inches.

Figure 14:
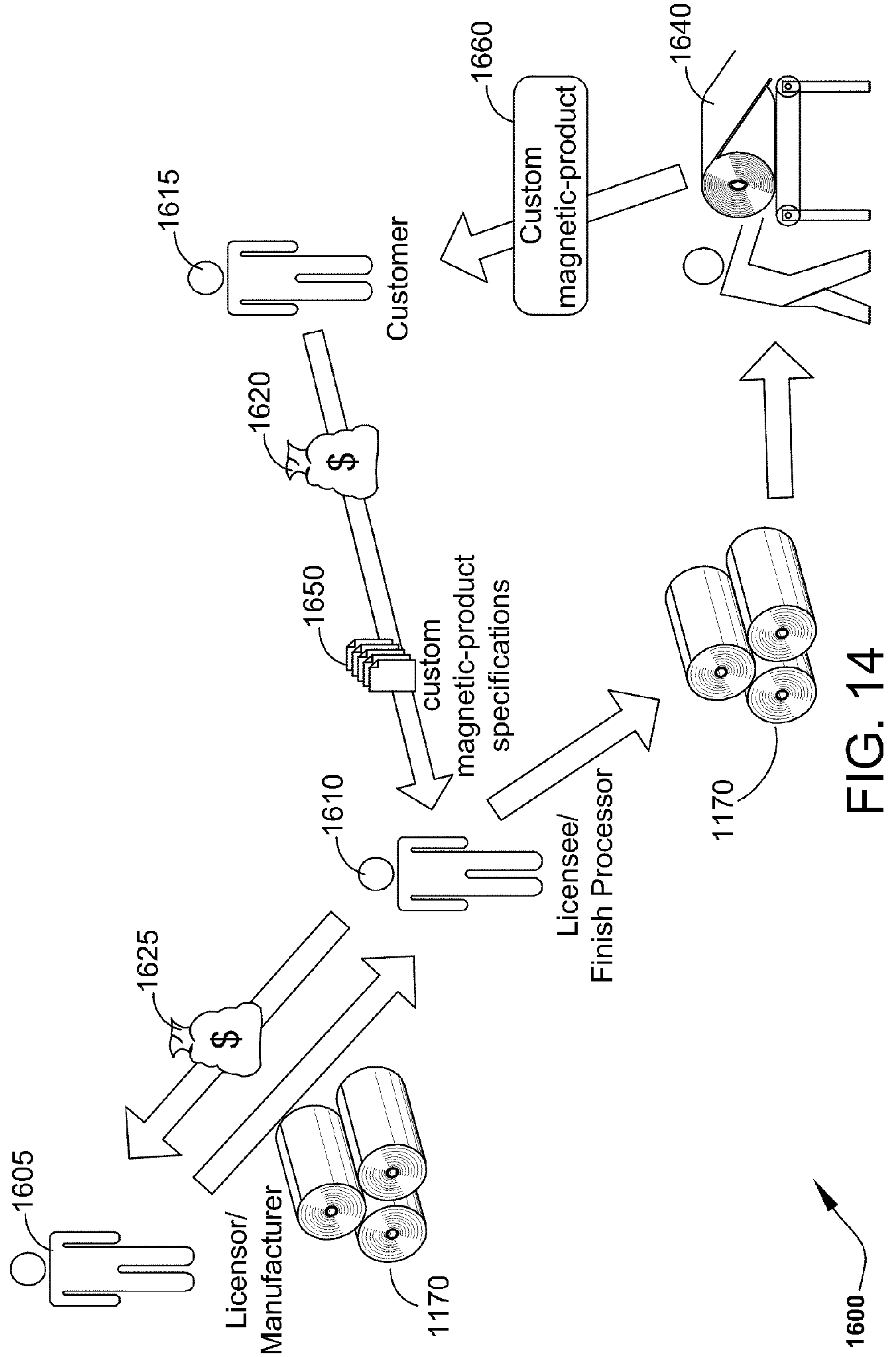
FIG. 14 shows a schematic view, illustrating a preferred method of monetizing preferred flexible magnetic sheet, according to a preferred embodiment of the present invention.

FIG. 14 shows a schematic view, illustrating a preferred method of monetizing magnetic aligning and plastic aligning of magnetic-particles within oriented magnetic-particle systems, according to a preferred embodiment of the present invention. The simplified flow diagram in FIG. 14 illustrates business method 1600. In business method 1600, licensor/manufacturer 1605 enters into an arrangement, preferably a license agreement, with licensee/finish processor 1610 (at least embodying herein identifying at least one custom-magnetic-products fabricator).

The license preferably includes at least payment of fee 1625 by licensee/finish processor 1610 to licensor/manufacturer 1605 in exchange for services provided by licensor/manufacturer 1605, (at least embodying herein monetizing trade arrangements for value, with such at least one fabricator) preferably including at least flexible magnetic film 1170, as shown (at least embodying herein supplying such fabricator with flexible magnetic film materials). Licensee/finish processor 1610 preferably arranges with customer 1615 to produce custom magnetic product 1660, as shown (at least embodying herein to assist custom-magnetic-products fabricating to at least one customer). Customer 1615 preferably delivers custom magnetic-product specifications 1650 to licensee/finish processor 1610, as shown. Preferably, based on custom magnetic-product specifications 1650, licensee/finish processor 1610 preferably manufacturers custom magnetic-product 1660.

Licensee/finish processor 1610 preferably arranges for the finishing of custom magnetic-product 1660 (at least embodying herein assisting such fabricator in fabricating such at least one custom-magnetic-product). After finishing custom magnetic-product 1660, licensee/finish processor 1610 preferably delivers it to customer 1615, as shown (at least embodying herein assisting such fabricator in contracting with such at least one customer). Further, licensee/finish processor 600 preferably brands custom magnetic-product 1660 delivered to a customer 1615 with licensor/manufacturer-approved words and indicia.

Figure 15:
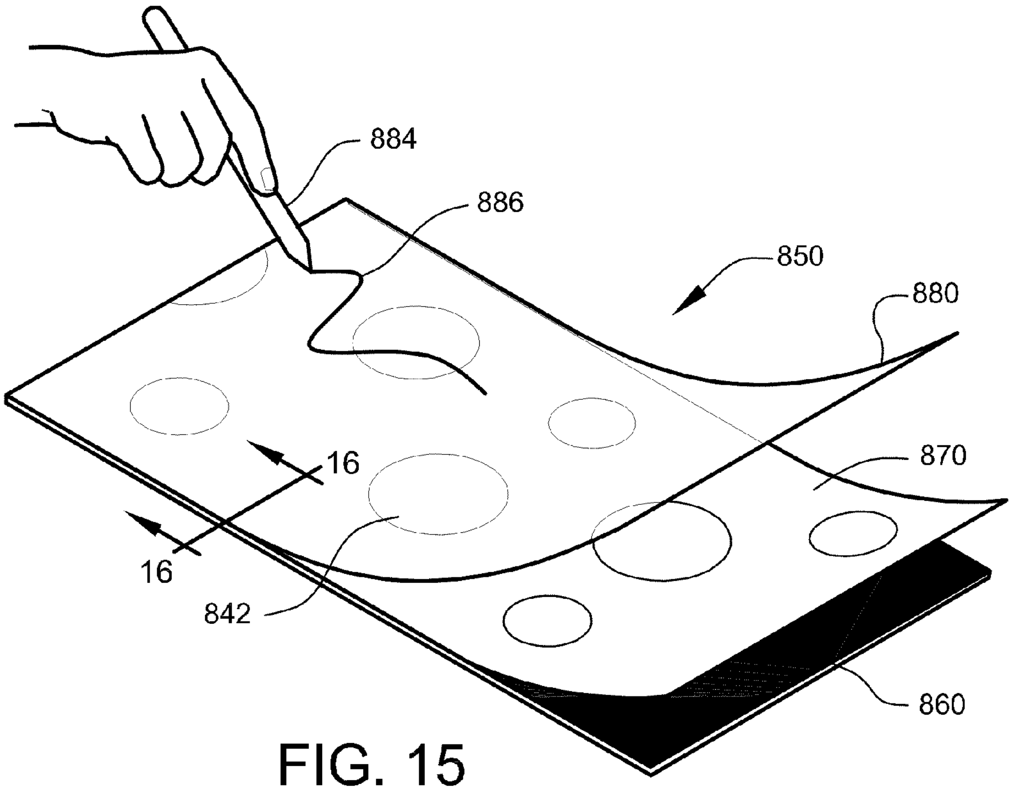
FIG. 15 shows a perspective view, illustrating a flexible magnetic sheet, according to a preferred embodiment of the current invention.
Figure 16:
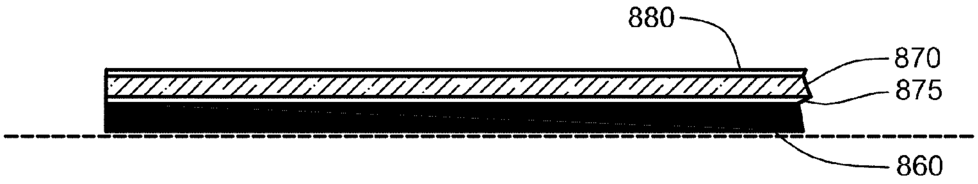
FIG. 16 shows a section view through section 12-12 of FIG. 11.

FIG. 15 shows a perspective view, illustrating a flexible magnetic sheet 850, according to a preferred embodiment of the current invention. FIG. 16 shows a section view through section 16-16 of FIG. 15. Preferably, flexible magnetic sheet 850 comprises a base magnetic layer 860 (flexible magnet 310 or flexible magnetic film 1170), a printed layer 870 and a dry-erase surface layer 880, as shown. In a preferred embodiment, base magnetic layer 860 comprises a 20 mil flexible magnet. Magnetic layer 860 is preferably attached to printed layer 870, preferably about a 3.2 mil paper layer, utilizing about one mil pressure sensitive acrylic adhesive 875. Printed layer 870 is then preferably laminated with dry-erase surface layer 880, preferably about a 1.2 mil polypropylene layer, as shown. Preferably, base magnetic layer 860, a printed layer 870 and a dry-erase surface layer 880 comprise essentially the same area dimension, as shown. Upon reading the teachings of this specification, those skilled in the art will now appreciate that, under appropriate circumstances, considering such issues as available materials, costs, future technologies, etc., other layers, such as, for example, writeable/printable layers, other writeable layers, heat coloring layers, etc., may suffice. Upon reading this specification, those with ordinary skill in the art will now appreciate that, under appropriate circumstances, considering such issues as design preference, user preferences, marketing preferences, cost, structural requirements, available materials, technological advances, etc., other combinations and arrangements such as, for example, perimeter magnetic portions, etc., may suffice.

Preferably, a user may use a dry erase marker 884 to place messages, artwork, or other indicia 886 onto the dry erase surface layer 880, as shown. In such manner, flexible magnetic sheet 850 may be placed onto a locker and messages may be left by the user or other such persons that may have access to such locker surface thereby providing a customizable locker interior, as shown. Upon reading the teachings of this specification, those skilled in the art will now appreciate that, under appropriate circumstances, considering such issues as available materials, cost, user preferences, etc., other writable surface layers, such as, for example, paper, other writable plastics, paint, etc., may suffice. Upon reading the teachings of this specification, those skilled in the art will now appreciate that, under appropriate circumstances, considering such issues as materials, cost, future technologies, etc., other writing instruments, such as, for example, permanent markers, white markers, pencils, erasable pens, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method, relating to providing magnetizable film sufficiently thin for use in secondary processes, comprising the step(s) of:

a) providing in bulk at least one binder material;

b) providing in bulk magnetizable particles; and c) mixing a first quantity of such binder material with a second quantity of such magnetizable particles;

d) wherein at least one configurable mix is provided; and e) configuring such at least one configurable mix into at least one continuous magnetizable film no thicker than about 15 mils;

f) wherein said at least one binder material comprises at least one slurry.

2. The method according to claim 1 wherein such step of configuring such at least one configurable mix into at least one continuous magnetizable film no thicker than about 15 mils comprises the step(s) of:

a) at least one shaping step of such at least one configurable mix to provide at least one intermediate configuration promoting magnetizing of such magnetizable particles; and b) at least one magnetizing step of such at least one intermediate configuration.

3. The method according to claim 2 wherein essentially each such at least one magnetizing step is followed by at least one de-magnetizing step.

4. The method according to claim 3 wherein such magnetizable particles comprise essentially a major-dimension particle-size range of about 20 micro-inches to about 100 micro-inches.

5. The method according to claim 3 wherein such magnetizable particles comprise at least one ferrite having magnetic properties based on compositions of $BaO.6Fe_2O_3$, where Ba is barium, Fe is iron, and O is oxygen.

6. The method according to claim 3 wherein such magnetizable particles comprise at least one ferrite having magnetic properties based on compositions of $SrO.6Fe_2O_3$, where Sr is strontium, Fe is iron, and O is oxygen.

7. The method according to claim 1 wherein such at least one binder material comprises at least one polymer.

8. The method according to claim 1 wherein such at least one binder material comprises at least one polyvinyl.

9. The method according to claim 1 wherein such at least one binder material comprises at least one polyurethane.

10. The method according to claim 1 wherein such at least one binder material comprises at least one polyamide.

11. The method according to claim 1 wherein such at least one binder material comprises at least one polyester.

12. The method according to claim 1 wherein such at least one binder material comprises at least one acrylic.

13. The method according to claim 1 wherein such at least one binder material comprises at least one copolymer of at least two of the following:

a) polyvinyl;

b) polyurethane;

c) acrylic;

d) polyester;

e) polyamide.

14. The method according to claim 1 wherein such at least one slurry substantially comprises thixotropic properties.

15. A method, relating to providing magnetizable film sufficiently thin for use in secondary processes, comprising the step(s) of:

a) providing in bulk at least one binder material;

b) providing in bulk magnetizable particles; and c) mixing a first quantity of such binder material with a second quantity of such magnetizable particles;

d) wherein at least one configurable mix is provided; and e) configuring such at least one configurable mix into at least one continuous magnetizable film no thicker than about 15 mils;

f) wherein such step of configuring such at least one configurable mix into at least one continuous magnetizable film no thicker than about 15 mils comprises the step(s) of i) at least one shaping step of such at least one configurable mix to provide at least one intermediate configuration promoting magnetizing of such magnetizable particles, and ii) at least one magnetizing step of such at least one intermediate configuration, iii) wherein such at least one shaping step is preceded by at least one viscosity adjustment step of such at least one configurable mix, iv) wherein such at least one viscosity adjustment step is followed by at least one plastic aligning step of such magnetic particles within such at least one configurable mix, v) wherein such at least one plastic aligning step is followed by at least one de-magnetizing step of such magnetic particles, and vi) wherein such at least one de-magnetizing step is followed by at least one viscosity adjustment step.

16. The method according to claim 15 wherein such at least one de-magnetizing step is followed by at least one take-up roller step.

17. A method, relating to providing magnetizable film sufficiently thin for use in secondary processes, comprising the step(s) of:

a) providing in bulk at least one binder material;

b) providing in bulk magnetizable particles; and c) mixing a first quantity of such binder material with a second quantity of such magnetizable particles;

d) wherein at least one configurable mix is provided; and e) configuring such at least one configurable mix into at least one continuous magnetizable film no thicker than about 15 mils;

f) wherein such step of configuring such at least one configurable mix into at least one continuous magnetizable film no thicker than about 15 mils comprises the step(s) of i) at least one shaping step of such at least one configurable mix to provide at least one intermediate configuration promoting magnetizing of such magnetizable particles, and ii) at least two magnetizing steps of such at least one intermediate configuration, iii) wherein essentially each of such at least two magnetizing steps is followed by at least one de-magnetizing step.

18. The method according to claim 17 wherein such at least one shaping step is preceded by at least one viscosity adjustment step of such at least one configurable mix.

19. The method according to claim 18 wherein such at least one viscosity adjustment step is followed by at least one plastic aligning step of such magnetic particles within such at least one configurable mix.

20. The method according to claim 19 wherein such at least one plastic aligning step is followed by at least one de-magnetizing step of such magnetic particles.

21. The method according to claim 20 wherein such at least one de-magnetizing step is followed by at least one viscosity adjustment step.

22. The method according to claim 17 wherein such magnetizable particles comprise essentially a major-dimension particle-size range of about 20 micro-inches to about 100 micro-inches.

23. The method according to claim 17 wherein such magnetizable particles comprise at least one ferrite having magnetic properties based on compositions of $BaO.6Fe_2O_3$, where Ba is barium, Fe is iron, and O is oxygen.

24. The method according to claim 17 wherein such magnetizable particles comprise at least one ferrite having magnetic properties based on compositions of $SrO.6Fe_2O_3$, where Sr is strontium, Fe is iron, and O is oxygen.

* * * * *